US012229145B2

(12) United States Patent
Dodson et al.

(10) Patent No.: US 12,229,145 B2
(45) Date of Patent: Feb. 18, 2025

(54) METADATA INHERITANCE FOR DATA ASSETS

(71) Applicant: Tableau Software, LLC, Seattle, WA (US)

(72) Inventors: Madge Marie Dodson, Seattle, WA (US); Tyler James-Buker Doyle, Seattle, WA (US); Ekaterina Grinevskaja, Seattle, WA (US); Dmitry Yevgenyevich Ryabkov, Seattle, WA (US); Qianfan Wang, Seattle, WA (US)

(73) Assignee: Tableau Software, LLC, Seattle, WA (US)

(*) Notice: Subject to any disclaimer, the term of this patent is extended or adjusted under 35 U.S.C. 154(b) by 378 days.

(21) Appl. No.: 17/588,161

(22) Filed: Jan. 28, 2022

(65) Prior Publication Data
US 2022/0382761 A1 Dec. 1, 2022

Related U.S. Application Data

(60) Provisional application No. 63/195,568, filed on Jun. 1, 2021.

(51) Int. Cl.
G06F 16/245 (2019.01)
G06F 16/2455 (2019.01)
G06F 21/62 (2013.01)

(52) U.S. Cl.
CPC .... *G06F 16/24564* (2019.01); *G06F 21/6227* (2013.01)

(58) Field of Classification Search
None
See application file for complete search history.

(56) References Cited

U.S. PATENT DOCUMENTS 5,550,971 A 8/1996 Brunner et al.
5,689,711 A 11/1997 Bardasz et al.
(Continued)

FOREIGN PATENT DOCUMENTS

WO 2006060773 A2 6/2006

OTHER PUBLICATIONS

Shortest Path and Distance Queries on Road Networks: Towards Bridging Theory and Practice; Andy Diwen Zhu; ACM;2013; pp. 857-868 (Year: 2013).*

(Continued)

*Primary Examiner* — Albert M Phillips, III
*Assistant Examiner* — Jermaine A Mincey
(74) *Attorney, Agent, or Firm* — Morgan, Lewis & Bockius LLP

(57) ABSTRACT

Embodiments are directed to managing data using a network computers. A hierarchy model that includes edges that represent dependency relationships between fields may be generated. In response to a query for determining values of metadata associated with an anchor field performing further actions, including: traversing the hierarchy model upwards from the anchor field based on the query, and in response to visiting field nodes in the hierarchy model, collecting the values of the metadata that correspond to the visited field node and terminating the traversal based on a type of the query; in response to visiting a calculation node, terminating the traversal of the hierarchy model associated with the visited calculation node; and in response to visiting a flow node that is dependent on two or more other nodes, terminating the traversal of the hierarchy model. The collected metadata may be provided in a response to the query.

20 Claims, 16 Drawing Sheets

(56) References Cited

U.S. PATENT DOCUMENTS

| | | | |
|---|---|---|---|
| 8,286,087 B1 | 10/2012 | Xian et al. | |
| 9,383,913 B2 | 7/2016 | Hoyer et al. | |
| 9,489,119 B1 | 11/2016 | Smith, Jr. | |
| 9,760,240 B2 | 9/2017 | Maheshwari et al. | |
| 9,881,066 B1 | 1/2018 | Yousaf et al. | |
| 10,275,265 B1 | 4/2019 | Gould et al. | |
| 10,445,170 B1 | 10/2019 | Subramanian et al. | |
| 10,698,955 B1 | 6/2020 | Broecheler | |
| 10,705,695 B1 | 7/2020 | Porath et al. | |
| 10,783,162 B1 | 9/2020 | Montague et al. | |
| 10,872,384 B1* | 12/2020 | Hanekamp, Jr. | G06Q 40/123 |
| 2004/0205562 A1 | 10/2004 | Rozek et al. | |
| 2006/0064674 A1 | 3/2006 | Olson et al. | |
| 2008/0126987 A1 | 5/2008 | Meschian et al. | |
| 2009/0006939 A1 | 1/2009 | DeSpain et al. | |
| 2009/0007122 A1 | 1/2009 | Peyton et al. | |
| 2009/0012983 A1 | 1/2009 | Senneville et al. | |
| 2010/0114629 A1 | 5/2010 | Adler et al. | |
| 2010/0138420 A1 | 6/2010 | Bator et al. | |
| 2010/0153438 A1* | 6/2010 | Asai | G06F 16/8373 |
| | | | 707/769 |
| 2010/0235771 A1 | 9/2010 | Gregg, III | |
| 2010/0313157 A1 | 12/2010 | Carlsson et al. | |
| 2010/0318583 A1 | 12/2010 | Cohen | |
| 2011/0219321 A1 | 9/2011 | Gonzalez Veron et al. | |
| 2012/0311497 A1 | 12/2012 | Bear et al. | |
| 2014/0026084 A1 | 1/2014 | Gilboa | |
| 2014/0058789 A1 | 2/2014 | Doehring et al. | |
| 2014/0074888 A1 | 3/2014 | Potter et al. | |
| 2014/0114907 A1 | 4/2014 | Kozina et al. | |
| 2014/0215405 A1 | 7/2014 | Breedvelt-Schouten | |
| 2014/0267287 A1 | 9/2014 | Dodgen et al. | |
| 2014/0330821 A1 | 11/2014 | Tullis et al. | |
| 2014/0372956 A1 | 12/2014 | Bisca et al. | |
| 2015/0112998 A1 | 4/2015 | Shankar et al. | |
| 2015/0339263 A1 | 11/2015 | Abu El Ata et al. | |
| 2015/0347091 A1 | 12/2015 | Ferko et al. | |
| 2016/0078361 A1 | 3/2016 | Brueckner et al. | |
| 2016/0103908 A1 | 4/2016 | Fletcher et al. | |
| 2016/0224532 A1 | 8/2016 | Miller et al. | |
| 2016/0224616 A1 | 8/2016 | Beacom et al. | |
| 2016/0232207 A1 | 8/2016 | Brunel et al. | |
| 2016/0314605 A1 | 10/2016 | Filippi et al. | |
| 2017/0010787 A1 | 1/2017 | Ranganathan et al. | |
| 2017/0075557 A1 | 3/2017 | Noble et al. | |
| 2017/0091317 A1 | 3/2017 | Cummings et al. | |
| 2017/0102694 A1 | 4/2017 | Enver et al. | |
| 2017/0103103 A1 | 4/2017 | Nixon et al. | |
| 2017/0140068 A1 | 5/2017 | Oh et al. | |
| 2017/0154088 A1 | 6/2017 | Sherman | |
| 2017/0161188 A1 | 6/2017 | Isoi | |
| 2017/0177681 A1 | 6/2017 | Potiagalov et al. | |
| 2017/0177744 A1 | 6/2017 | Potiagalov et al. | |
| 2017/0178368 A1 | 6/2017 | Noon et al. | |
| 2017/0193049 A1 | 7/2017 | Grehant | |
| 2017/0213131 A1 | 7/2017 | Hammond et al. | |
| 2017/0220633 A1 | 8/2017 | Porath et al. | |
| 2017/0286526 A1 | 10/2017 | Bar-Or et al. | |
| 2017/0293666 A1 | 10/2017 | Ragavan et al. | |
| 2017/0316355 A1 | 11/2017 | Shrestha et al. | |
| 2018/0024731 A1 | 1/2018 | Sanches et al. | |
| 2018/0067998 A1 | 3/2018 | Sherman et al. | |
| 2018/0129369 A1 | 5/2018 | Kim et al. | |
| 2018/0157702 A1 | 6/2018 | Clemens et al. | |
| 2018/0218050 A1 | 8/2018 | Porath et al. | |
| 2018/0260106 A1 | 9/2018 | Leonard et al. | |
| 2018/0260903 A1 | 9/2018 | Callery | |
| 2019/0034489 A1 | 1/2019 | Ziegler | |
| 2019/0095395 A1 | 3/2019 | Piecko | |
| 2019/0188308 A1 | 6/2019 | Simon et al. | |
| 2019/0286668 A1 | 9/2019 | Puzicha et al. | |
| 2019/0294720 A1 | 9/2019 | Beringer et al. | |
| 2019/0325292 A1 | 10/2019 | Remis et al. | |
| 2019/0332599 A1 | 10/2019 | Woo | |
| 2019/0384836 A1 | 12/2019 | Roth et al. | |
| 2020/0104401 A1 | 4/2020 | Burnett et al. | |
| 2020/0104402 A1 | 4/2020 | Burnett et al. | |
| 2020/0175006 A1 | 6/2020 | Hughes | |
| 2020/0285803 A1 | 9/2020 | Edge et al. | |
| 2020/0334277 A1* | 10/2020 | Doyle | G06F 16/211 |
| 2020/0372057 A1 | 11/2020 | Tonkin et al. | |
| 2020/0401623 A1 | 12/2020 | Dilts et al. | |
| 2021/0263900 A1 | 8/2021 | Joyce et al. | |
| 2021/0390420 A1 | 12/2021 | Barnett | |
| 2022/0113150 A1 | 4/2022 | Hidayat et al. | |

OTHER PUBLICATIONS

Nadathur Satish; Navigating the Maze of Graph Analytics Frameworks using Massive Graph Datasets; pp. 979-990 (Year: 2014).*

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 mailed Jul. 24, 2020, pp. 1-27.

Office Communication for U.S. Appl. No. 16/586,554 mailed Nov. 24, 2020, pp. 1-28.

Office Communication for U.S. Appl. No. 16/586,554 mailed Feb. 16, 2021, pp. 1-7.

Office Communication for U.S. Appl. No. 16/586,554 mailed Apr. 2, 2021, pp. 1-37.

Office Communication for U.S. Appl. No. 16/725,986 mailed Apr. 2, 2021, pp. 1-23.

Papenbrock, Thorsten et al., "Data-driven Schema Normalization," in Proceedings of the 20th International Conference on Extending Database Technology, 2017, pp. 342-353.

Brunel, Robert et al., "Supporting Hierarchical Data in SAP HANA," 2015 IEEE 31st International Conference on Data Engineering (ICDE), 2015, pp. 1-12.

Office Communication for U.S. Appl. No. 16/984,014 mailed Aug. 10, 2021, pp. 1-32.

Furmanova, Katarina et al., "Taggle: Scalable Visualization of Tabular Data through Aggregation," IEEE Transactions on Visualization and Computer Graphics, 2017, pp. 1-14.

Office Communication for U.S. Appl. No. 16/586,554 mailed Sep. 27, 2021, pp. 1-45.

Office Communication for U.S. Appl. No. 16/725,986 mailed Sep. 30, 2021, pp. 1-10.

Office Communication for U.S. Appl. No. 17/091,536 mailed Nov. 5, 2021, pp. 1-25.

Office Communication for U.S. Appl. No. 16/944,043 mailed Nov. 26, 2021, pp. 1-49.

Office Communication for U.S. Appl. No. 16/586,554 mailed Dec. 15, 2021, pp. 1-7.

Office Communication for U.S. Appl. No. 16/984,014 mailed Jan. 3, 2022, pp. 1-31.

Office Communication for U.S. Appl. No. 16/586,554 mailed Feb. 24, 2022, pp. 1-47.

Office Communication for U.S. Appl. No. 16/984,014 mailed Mar. 18, 2022, pp. 1-5.

Office Communication for U.S. Appl. No. 16/944,043 mailed Apr. 19, 2022, pp. 1-10.

Office Communication for U.S. Appl. No. 16/984,014 mailed Apr. 20, 2022, pp. 1-33.

Office Communication for U.S. Appl. No. 17/091,536 mailed Apr. 25, 2022, pp. 1-32.

Office Communication for U.S. Appl. No. 17/091,536 mailed Jul. 7, 2022, pp. 1-5.

Office Communication for U.S. Appl. No. 17/091,536 mailed Aug. 16, 2022, pp. 1-38.

Gillis, Alexander S. et al., "What is integrated development environment (IDE)?—Definition from WhatIs.com," Sep. 2018, TechTarget, https://www.techtarget.com/searchsoftwarequality/definition/integrated-development-environment, Accessed: Aug. 16, 2022, pp. 1-4.

Office Communication for U.S. Appl. No. 16/586,554 mailed Aug. 17, 2022, pp. 1-56.

(56) References Cited

OTHER PUBLICATIONS

Office Communication for U.S. Appl. No. 17/370,367 mailed Sep. 1, 2022, pp. 1-13.
International Search Report and Written Opinion for International Patent Application No. PCT/US2022/034283 mailed Oct. 27, 2022, pp. 1-12.
Office Communication for U.S. Appl. No. 16/586,554 mailed Nov. 21, 2022, pp. 1-6.
Office Communication for U.S. Appl. No. 16/586,554 mailed Jan. 5, 2023, pp. 1-24.
Office Communication for U.S. Appl. No. 17/370,367 mailed Jan. 27, 2023, pp. 1-14.
Office Communication for U.S. Appl. No. 17/409,299 mailed Feb. 14, 2023, pp. 1-28.
Bauer, Reinhard et al., "The Shortcut Problem—Complexity and Algorithms," Journal of Graph Algorithms and Applications, Aug. 2012, vol. 16, No. 2, pp. 447-481.
Hesse, William, "Directed Graphs Requiring Large Numbers of Shortcuts," in Proceedings of the Fourteenth Annual ACM-SIAM Symposium on Discrete Algorithms, Jan. 2003, pp. 665-669.
Office Communication for U.S. Appl. No. 17/542,148 mailed Feb. 17, 2023, pp. 1-8.
International Search Report and Written Opinion for International Patent Application No. PCT/US2022/031195 mailed Aug. 31, 2022, pp. 1-12.
International Search Report and Written Opinion for International Patent Application No. PCT/US2020/028163 mailed Jul. 21, 2020, pp. 1-7.
Office Communication for U.S. Appl. No. 16/389,389 mailed May 13, 2021, pp. 1-16.
Office Communication for U.S. Appl. No. 16/389,389 mailed Aug. 18, 2021, pp. 1-9.
Office Communication for U.S. Appl. No. 17/542,148 mailed Feb. 28, 2023, pp. 1-2.
Office Communication for U.S. Appl. No. 17/091,536 mailed Mar. 10, 2023, pp. 1-10.
Office Communication for U.S. Appl. No. 17/091,536 mailed Mar. 16, 2023, pp. 1-3.
Office Communication for U.S. Appl. No. 17/370,367 mailed Apr. 6, 2023, pp. 1-4.
Office Communication for U.S. Appl. No. 17/370,367 mailed May 24, 2023, pp. 1-18.
Office Communication for U.S. Appl. No. 17/542,148 mailed Oct. 27, 2022, pp. 1-14.
International Search Report and Written Opinion for International Patent Application No. PCT/US2022/038328 mailed Nov. 30, 2022, pp. 1-12.
Office Communication for U.S. Appl. No. 17/535,465 mailed Jun. 8, 2023, pp. 1-7.
Office Communication for U.S. Appl. No. 17/409,299 mailed Jun. 28, 2023, pp. 1-36.
Office Communication for U.S. Appl. No. 17/091,536 mailed Jul. 24, 2023, pp. 1-7.

* cited by examiner

| Data Object Attribute | |
|---|---|
| Label | Name1 |
| Value | Eric |
| Type | String |
| ... | ... |
| Description | Customer Firstname |
| Notes | added in ver 2.0 |
| ... | ... |

802 — { Label, Value, Type, ... }
804 — { Description, Notes, ... }

```
// REQUEST for FIRST inherited description of field C
{
    fields (filter: {name: "field C"}) {
        name
        description
        descriptionInherited(inheritanceType: FIRST) {
        ...
        }
    }
}
```

1404

```
// RESPONSE for FIRST inherited description of field C
{
  name: "field C",
  description: null,
  descriptionInherited
    [
      {
        assetId: "0666567a-541b-62a5-a4c1-bae1e7f1d7ad",
        attribute: "description",
        value: "BBBBB",
        edges: []
        distance: 1,
        asset {
          name: "field B"
          datasource: {
              name: "published datasource B"
          }
        }
      }
    ]}
```

```
// REQUEST for CHAIN inherited description of field C
{
    fields (filter: {name: "field C"}) {
        name
        description
        descriptionInherited(inheritanceType: CHAIN){
            ...
        }
    }
}
```

1504

```
// RESPONSE for CHAIN inherited description of field C
  name: "field C",
  description: null,
  descriptionInherited
    [
      {
        assetId: "0666567a-541b-62a5-a4c1-bae1e7f1d7ad",
        attribute: "description",
        value: "BBBBB",
        edges: ["e3791d6e-ef2c-e4ae-1831-a3fa9fa0677d"],
        distance: 1,
        asset: {
          datasource:
              name: "Datasource B"
        }
      },
      {
        assetId: "e3791d6e-ef2c-e4ae-1831-a3fa9fa0677d",
        attribute: "description",
        value: "AAAAA",
        edges: [],
        distance: 2,
        asset: {
          table:
              name: "Table A"
        }
      }
    ]
```

*Fig. 15*

```
// RESPONSE for FIRST inherited description of field E
{ // no value returned because flow field inputs are
ambiguous
  name: "field E",
  description: null,
  descriptionInherited []
}
```

METADATA INHERITANCE FOR DATA ASSETS

CROSS-REFERENCE TO RELATED APPLICATION

This application is a Utility patent application based on previously filed U.S. Provisional Patent Application No. 63/195,568 filed on Jun. 1, 2021, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively, to managing the data associated with objects included in visualizations.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. Accordingly, in some cases, organizations may employ various applications or tools to generate visualizations based on some or all of their data. Employing visualizations to represent data may enable organizations to improve their understanding of business operations, sales, customer information, employee information, key performance indicators, or the like. In some cases, sophisticated visualizations may incorporate or otherwise depend on data from a variety of sources within an organization, including different databases. In some cases, there may be many different visualizations may depend on these varied or disparate data sources. Often data defined in the different data sources may include metadata, including, descriptions, labels, tags, or the like. Authors/designers of the data sources may associate metadata with various data to convey information that may be of interest to visualization authors or visualization users. However, data objects accessed by visualization authors or visualization users may be logically distant from the data in the data sources. Accordingly, determining when or if metadata may be propagated to data objects used by visualization authors or visualization users may be difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a logical schematic of a data object that includes metadata information in accordance with one or more of the various embodiments;

FIG. 14 illustrates a logical representation of a query for metadata inheritance for data assets in accordance with one or more of the various embodiments;

FIG. 15 illustrates a logical representation of a query for metadata inheritance for data assets in accordance with one or more of the various embodiments.

DETAILED DESCRIPTION OF THE VARIOUS EMBODIMENTS

Figure 1:
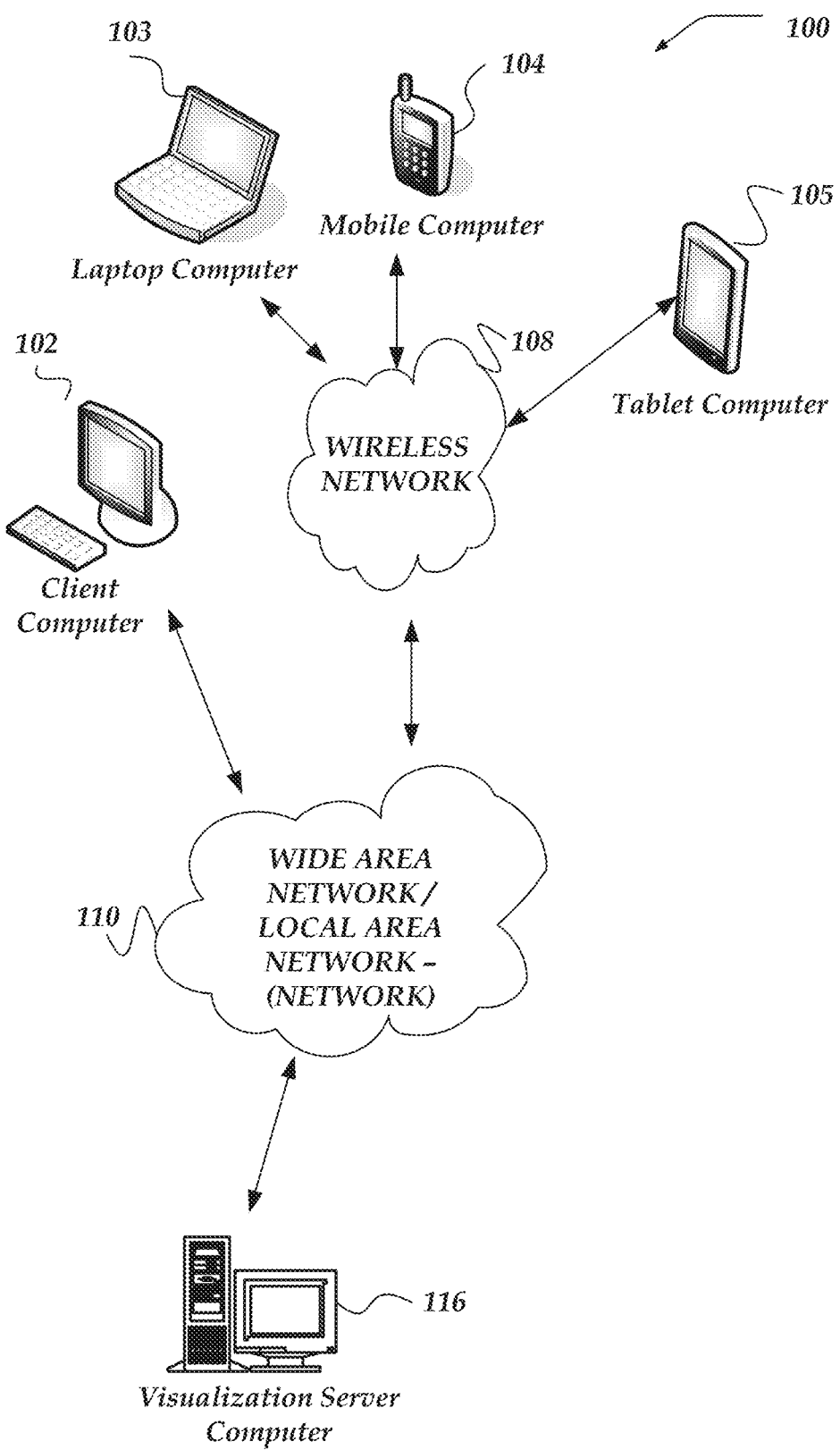
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein the term "data object" refers to one or more entities or data structures that comprise data models. In some cases, data objects may be considered portions of the data model. Data objects may represent classes or kinds of items, such as, databases, data-sources, tables, workbooks, visualizations, work-flows, or the like.

As used herein the term "data object class" or "object class" refers to a one or more entities or data structures that represent a class, kind, or type of data objects.

As used herein the term "display model" refers to one or more data structures that represent one or more representations of a data model that may be suitable for use in a visualization that is displayed on one or more hardware displays. Display models may define styling or user interface features that may be made available to non-authoring user.

As used herein, the term "dependency hierarchy" refers to one or more data structures that represent a specialized model for representing lineage information for a corresponding data model. Dependency hierarchies often include field nodes for storing/representing of values of data object attributes, calc nodes that represent applied data transformations that may change the semantic meaning of data, or flow nodes that represent data transformations that do not materially alter the semantic meaning of the transformed data. Edges between the nodes represent that data or information from nodes higher in the dependency hierarchy may be propagated to nodes further down in the dependency hierarchy. Data dependencies between data objects in a data model may be traced via dependency hierarchies.

As used herein, the term "metadata query" refers to query information that represents a request for metadata information for one or more data objects. In some cases, metadata queries may be resolved using dependency hierarchies that correspond to a data model.

As used herein, the term "display object" refers to one or more data structures that comprise display models. In some cases, display objects may be considered portions of the display model. Display objects may represent individual instances of items or entire classes or kinds of items that may be displayed in a visualization. In some embodiments, display objects may be considered or referred to as views because they provide a view of some portion of the data model.

As used herein, the term "anchor field" refers to a field node in a dependency hierarchy that has been selected to be a starting point for determining metadata inheritance. Metadata queries may define an anchor field which may often be the focus of the metadata query.

As used herein, the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using a network computers. In one or more of the various embodiments, a hierarchy model that includes one or more edges that represent dependency relationships between one or more field nodes, one or more calculation nodes, or one or more flow nodes may be generated.

In one or more of the various embodiments, in response to a query for determining one or more values of metadata associated with an anchor field that is a field node in the hierarchy model, performing further actions, including: traversing the hierarchy model upwards from the anchor field based on the query and the hierarchy model, and performing further actions, comprising: in response to visiting one or more field nodes in the hierarchy model, collecting the one or more values of the metadata that correspond to the visited field node, wherein the traversal is terminated based on a type of the query; in response to visiting a calculation node, terminating the traversal of the hierarchy model associated with the visited calculation node; and in response to visiting a flow node that is dependent on two or more other nodes in the hierarchy model, terminating the traversal of the hierarchy model associated with the visited flow node.

In one or more of the various embodiments, a response to the query may be provided that includes the one or more collected values of the metadata that are inheritable to the anchor field.

In one or more of the various embodiments, terminating the traversal based on the type of the query may include: in response to the query being a first query type, terminating the traversal of the hierarchy model in response to visiting a first ancestor field node of the anchor field that may be associated with a value of the metadata such that the value of the metadata collected from the first ancestor field node may be provided as the metadata for the anchor field.

In one or more of the various embodiments, terminating the traversal based on the type of the query may further include: in response to the query being a second query type, further actions may be performed, including: visiting each field node in the hierarchy model that is an ancestor of the anchor field such that visiting an intervening calculation node or an intervening multi-input flow node terminates the traversal of the hierarchy model; and collecting the one or more values of the metadata for each visited field node that is an ancestor of the anchor field such that the one or more values of the metadata may be sorted based on the one or more dependency relationships in the hierarchy model that may correspond to the anchor field and the one or more visited ancestor field nodes.

In one or more of the various embodiments, traversing the hierarchy model may include: determining one or more security policies associated with the hierarchy model based on the query and a client that provided the query; comparing the one or more visited field nodes and the client to the one or more security policies; determining one or more restricted field nodes in the hierarchy model based on the comparison such that the one or more security policies exclude the client from accessing information associated with the one or more restrict field nodes; and excluding the one or more values of the metadata that maybe associated with the one or more restricted field nodes from the response to the query such that one or more of an identifier, or data type associated with the one or more restricted field nodes maybe included in the response to the query.

In one or more of the various embodiments, one or more of a timeout value or a node visitation limit value may be determined based on one or more of a query type, or the query. In some embodiments, in response to a time to provide the response to the query exceeding the timeout value, terminating the traversal of the hierarchy model and providing a partial response to the query that includes the one or more collected values of the metadata. Or, in response to a number of nodes visited in the hierarchy model exceeding the node visitation limit value, terminating the traversal of the hierarchy model and providing a partial response that includes the one or more collected values of the metadata.

In one or more of the various embodiments, the type of query may be determined based on information provided with query. In some embodiments, the one or more conditions for terminating the traversal may be determined based on the type of query. In some embodiments, response information to include in the response to the query may be determined based on the type of query such that the response information may include one or more of the one or more values of the metadata, one or more aggregated values based on the one or more values of the metadata, or an execution of one or more other actions defined by the type of query.

In one or more of the various embodiments, in response to the anchor field being associated with a value of the metadata, the value of the metadata associated with the anchor field may be included in the response to the query. And, in some embodiments, in response to the value of the metadata being absent from the anchor field, providing the value of the metadata associated with an ancestor field node in the hierarchy model that is nearest the anchor field in the response to the query.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
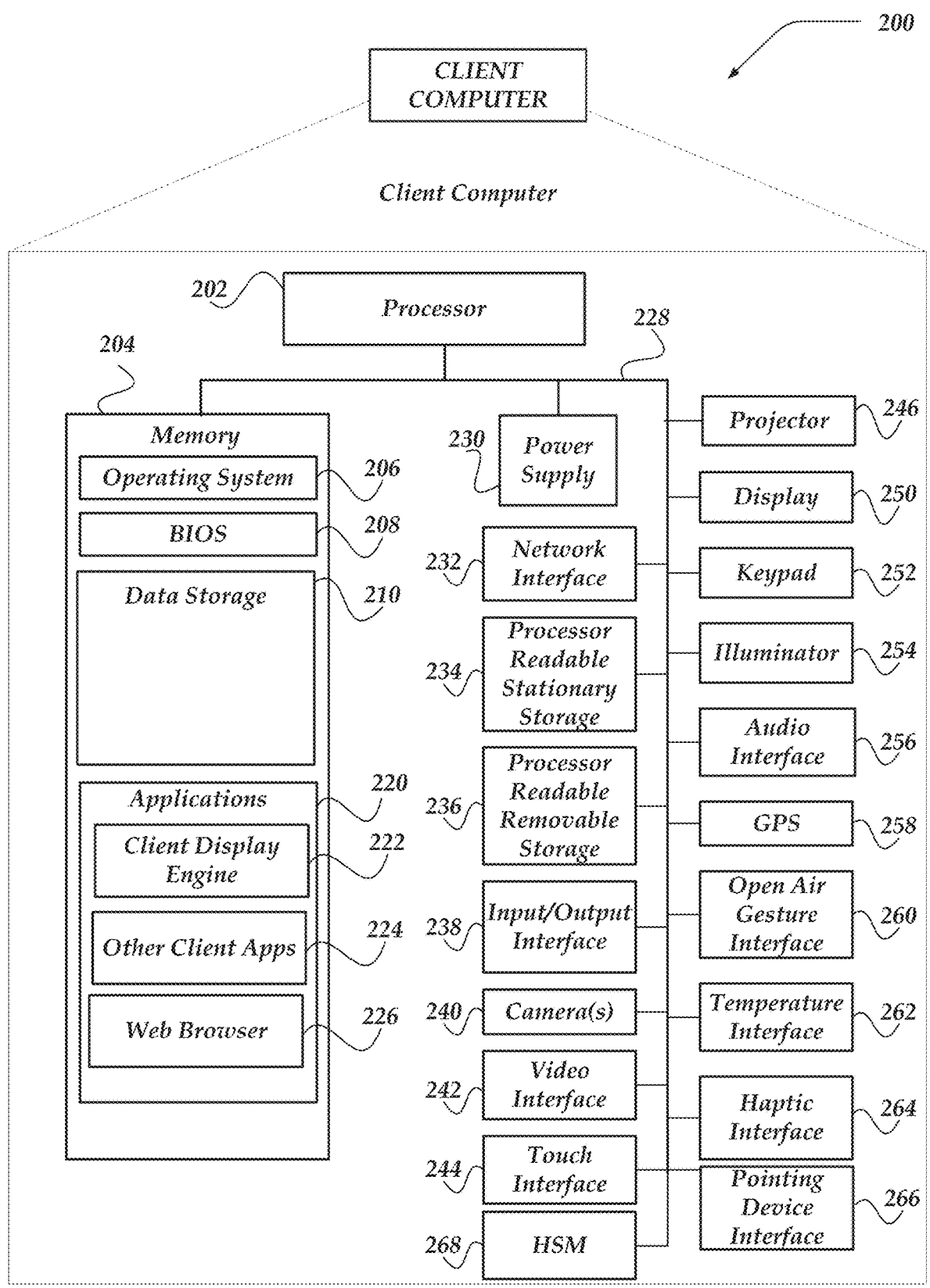
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux™, or a specialized client computer communication operating system such as Windows Phone™, Android™, or the IOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
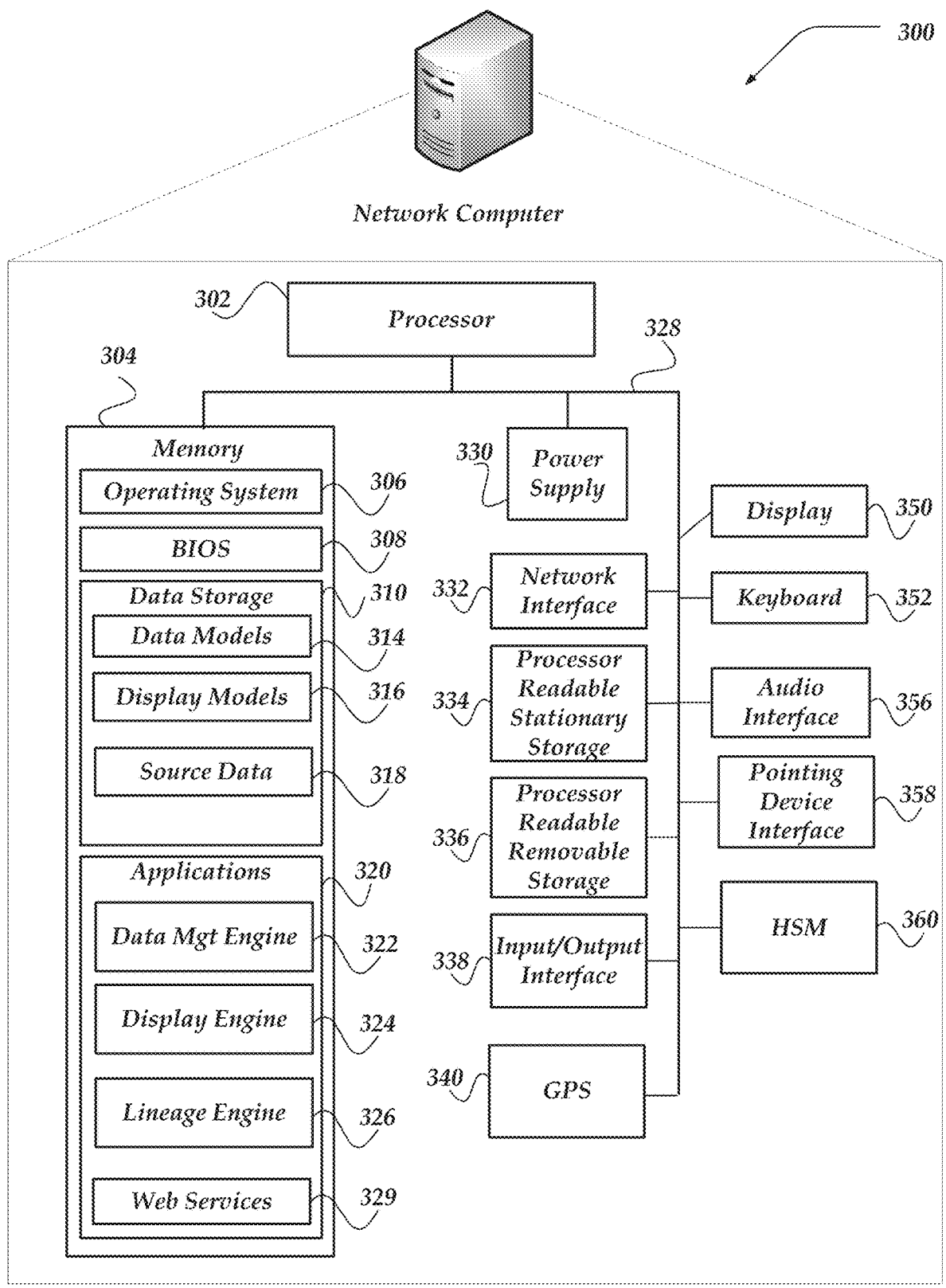
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, data management engine 322, display engine 324, lineage engine 326, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, source data 318, or the like. Data models 314 may store files, documents, versions, properties, meta-data, data structures, or the like, that represent one or more portions of one or more data models. Display models 316 may store display models. Source Data 318 may represent memory used for storing databases, or other data sources that contribute the data that underlies the data models, display models, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include data management engine 322, display engine 324, lineage engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, data management engine 322, display engine 324, lineage engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to data management engine 322, display engine 324, web services 329, or the like, may be provisioned and de-commissioned automatically.

Also, in one or more of the various embodiments, data management engine 322, display engine 324, lineage engine 326, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
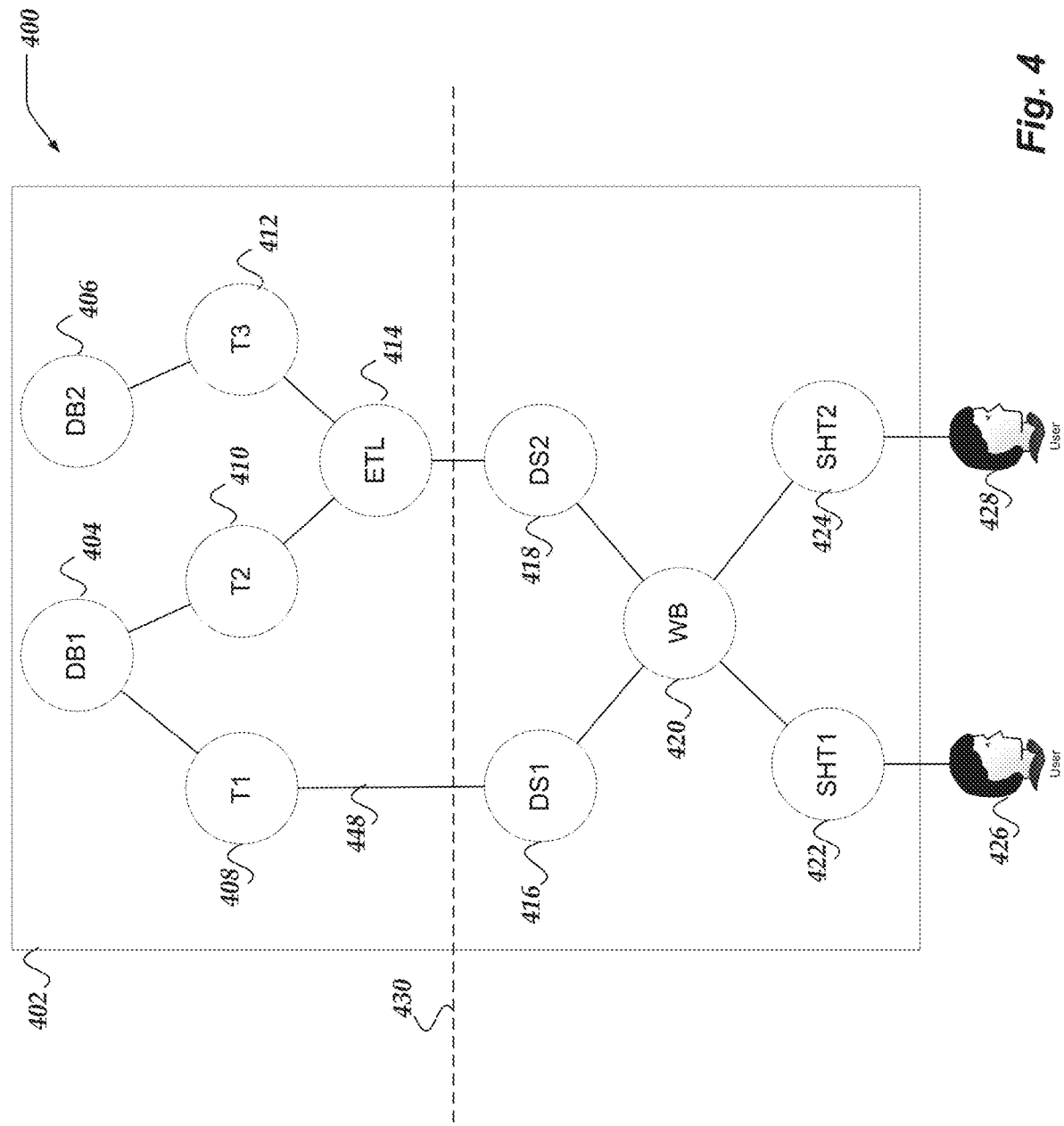
FIG. 4 illustrates a logical architecture of a system for metadata inheritance for data assets in accordance with one or more of the various embodiments.

FIG. 4 illustrates a logical architecture of system 400 for metadata inheritance for data assets in accordance with one or more of the various embodiments. In one or more of the various embodiments, system 400 may include various components, such as, data model 402, which may be comprised of various data objects ranging from one or more databases objects to one or more visualizations. In this example, data model 402 includes database object 404, database object 406, table object 408, table object 410, table object 412, workflow object 414, data source object 416, data source object 418, workbook object 420, sheet object 422, and sheet object 424.

In one or more of the various embodiments, visualization server computers, such as, visualization server computer 116 may be arranged to employ data models, such as, data model 402 to represent information that may be used for generating visualizations. Also, in some embodiments, data models may be used to manage other actors in a visualization system, including, users, authors, or the like.

In this example, data model 402 may have one or more root level data objects, such as, data object 404 and data object 406. Data object 404 and data object 406 represent databases that may be a source of information that drives the data model. For example, data object 404 may represent a SQL RDBMS associated with one part of an organization while data object 406 may represent an API gateway to another information provider or other databases.

In one or more of the various embodiments, data object 408, data object 410, data object 412, or the like, represent tables or table-like objects that may be provided by one or more databases. At this level of the data model, the data objects may be considered to wrap or otherwise closely model the entities provided from the databases. Accordingly, in some embodiments, properties or attributes of table or database objects may closely mirror their native representations including attribute names, data types, table names, column names, or the like. For example, data administrators may be enabled to "import" databases or tables into a data model such that the imported objects retain some or all of the features or attributes that are available in native form. In some cases, in some embodiments, one or more imported data objects may include metadata information that may be imported as well.

In one or more of the various embodiments, before an imported table object may be used for visualizations, data administrators may have to perform or execute one or more actions to the prepare the information for consumption by visualizations or visualization authors. In this example, extract-transform-load (ETL) object 414 represents an ETL process that does some processing on information in table object 410 and table object 412 before it is made available for use in visualizations.

In one or more of the various embodiments, data source objects, such as, data source 416 or data source 418 represent data objects that may be available for visualization authors to incorporate into visualizations or other display models. In some embodiments, data source objects may provide data administrators control to manage or otherwise shape the information from databases (e.g., database 404 or database 406) that may be made available to visualizations or visualization authors. For example, one or more tables in database 404 may include sensitive information that an organization want to exclude from visualizations. Accordingly, in some embodiments, by selecting mapping attributes from table objects to data source objects, data administrators may control how data is exposed from the underlying databases. In some embodiments, data administrators may be enabled select particular columns or attributes from table objects to include in data sources. Also, in some embodiments, attribute names (e.g., column names) in table objects may be mapped to different names in data sources. For example, a table column named customer identifier in a table object may be mapped to an attributed named 'Account Number' in the data source. Further, in some embodiments, other transformations of mappings may be performed, such as, data type conversions, aggregations, filtering, combining, or the like. In some embodiments, extensive or complex transformations may be encapsulated in ETL objects, or the like, whereas simpler or more common transformations may be enabled without using a separate ETL object.

In one or more of the various embodiments, edge 448 represents a mapping from a table object to a data source. In this example, edge 448 may represent the one or more data structures that map one or more attributes (e.g., columns) of table object 408 to data source 416. Accordingly, in some embodiments, edge 448 provides or is associated one or more mapping rules or instructions that define which information from table object 408 is available in data source 416, as well as, how the information from table object 408 may appear to visualization authors.

In one or more of the various embodiments, workbook object 420 represents a data object that may be associated with one or more user level data objects, such as, sheet object 422 or sheet object 424. In some embodiments, visualization authors may be enabled to design workbooks, such as, workbook object 420, based on information provided by one or more data sources, such as, data source 416 or data source 418. In some embodiments, visualization authors may design workbooks that include one or more sheets (e.g., sheet object 422 or sheet object 424. In some embodiments, sheet objects may include one or more visualizations, or the like.

In one or more of the various embodiments, sheet object 422 or sheet object 424 may represent some or all of the information that may be provided to a visualization engine, or the like, that provide one or more interactive visualization applications or reports that may be employed by users. In this example, sheet object 422 or sheet object 424 may be considered to include or reference one or more of data, meta-data, data structures, or the like, that may be used to render one or more visualizations of information that may be provided by one or more databases. In some embodiments, sheets may be arranged to include one or more display models, styling information, text descriptions, narrative information, stylized graphics, links to other sheets, or the like.

Accordingly, in some embodiments, users, such as, user 426 or user 428 may be enabled to access the sheets. The content or visualizations in a sheet may depend on its design and the information it is based on (e.g., the information from database 404 or database 406). Typically, sheets or the included visualizations may be dependent one or more attributes, columns, or the like, from one or more databases. Likewise, in some embodiments, dependencies that may be associated with a database may propagate through other data objects, such as, tables, data sources, workbooks, or the like. In some cases, other data objects interposed between a sheet and its underlying database may introduce additional dependencies that may propagate through to sheets or visualizations.

In one or more of the various embodiments, it may be advantageous to propagate relevant or qualifying metadata that may be associated with data objects to one or more dependent data objects. However, in some cases, intervening data objects or data transformations may make the metadata associated with ancestor objects meaningless or confusing with respect to one or more descendant/dependent data objects or data object attributes. Accordingly, in some embodiments, lineage engines may be arranged to employ various strategies (in the form of query types) to determine if metadata may be qualified to propagate to dependent objects.

Figure 5:
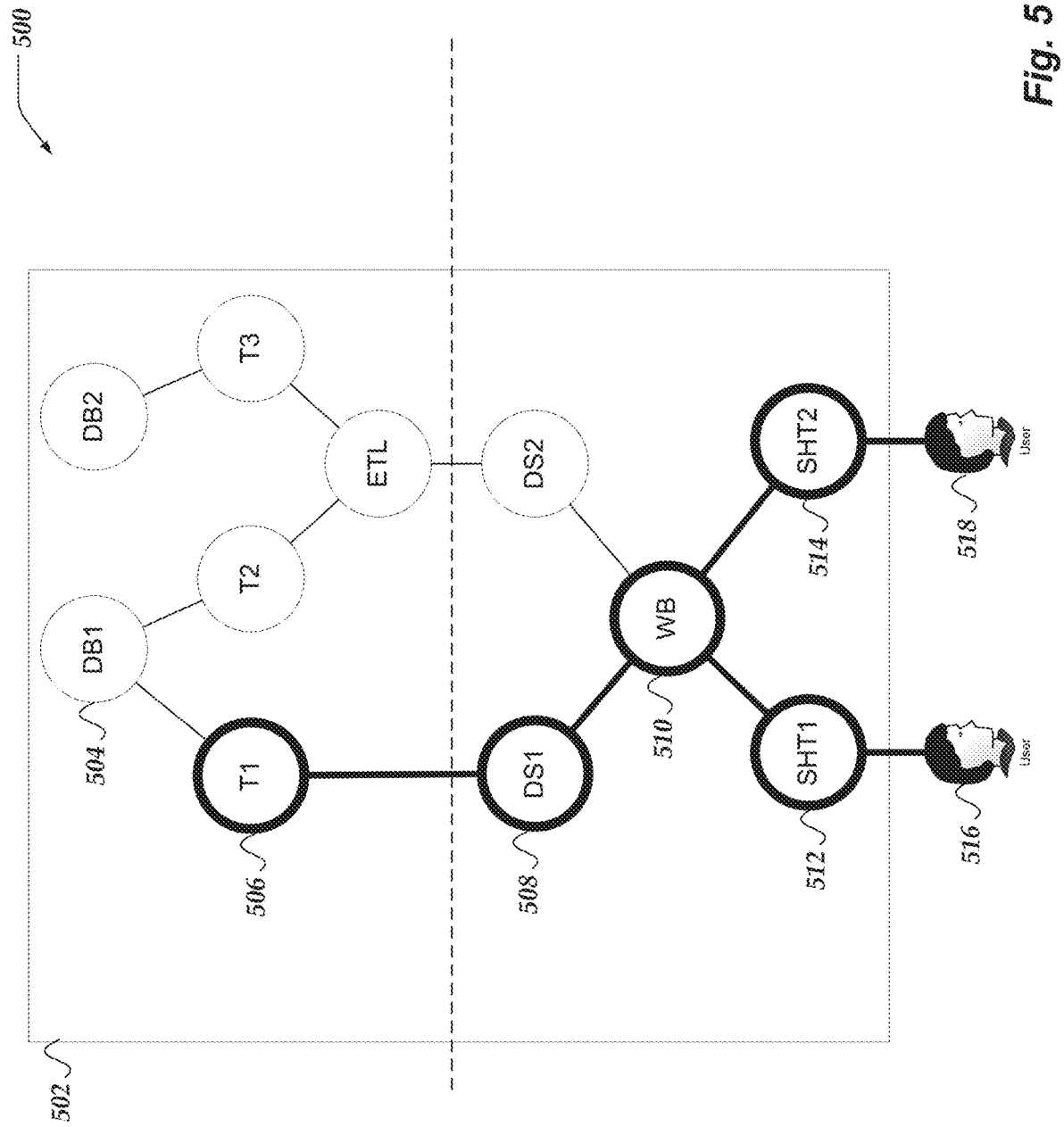
FIG. 5 illustrates a logical representation of a portion of a system for metadata inheritance for data assets in accordance with one or more of the various embodiments.

FIG. 5 illustrates a logical representation of a portion of system 500 for metadata inheritance for data assets in accordance with one or more of the various embodiments. In this example, for some embodiments, data model 502 may be considered similar to data model 402 described above. However, this example shows how a portion of the data objects in the data model may be related or dependent.

In this example, data object 506 represents a data object that may be associated with metadata information. Accordingly, in this example, some or all of the metadata associated with data object 506 may be eligible to propagate to various dependent data objects, such as, data object 508, data object 510, data object 512, data object 514, or the like. Also, in this example, user 516 or user 518 may be users that rely on or own data object 512 or data object 514.

Figure 6:
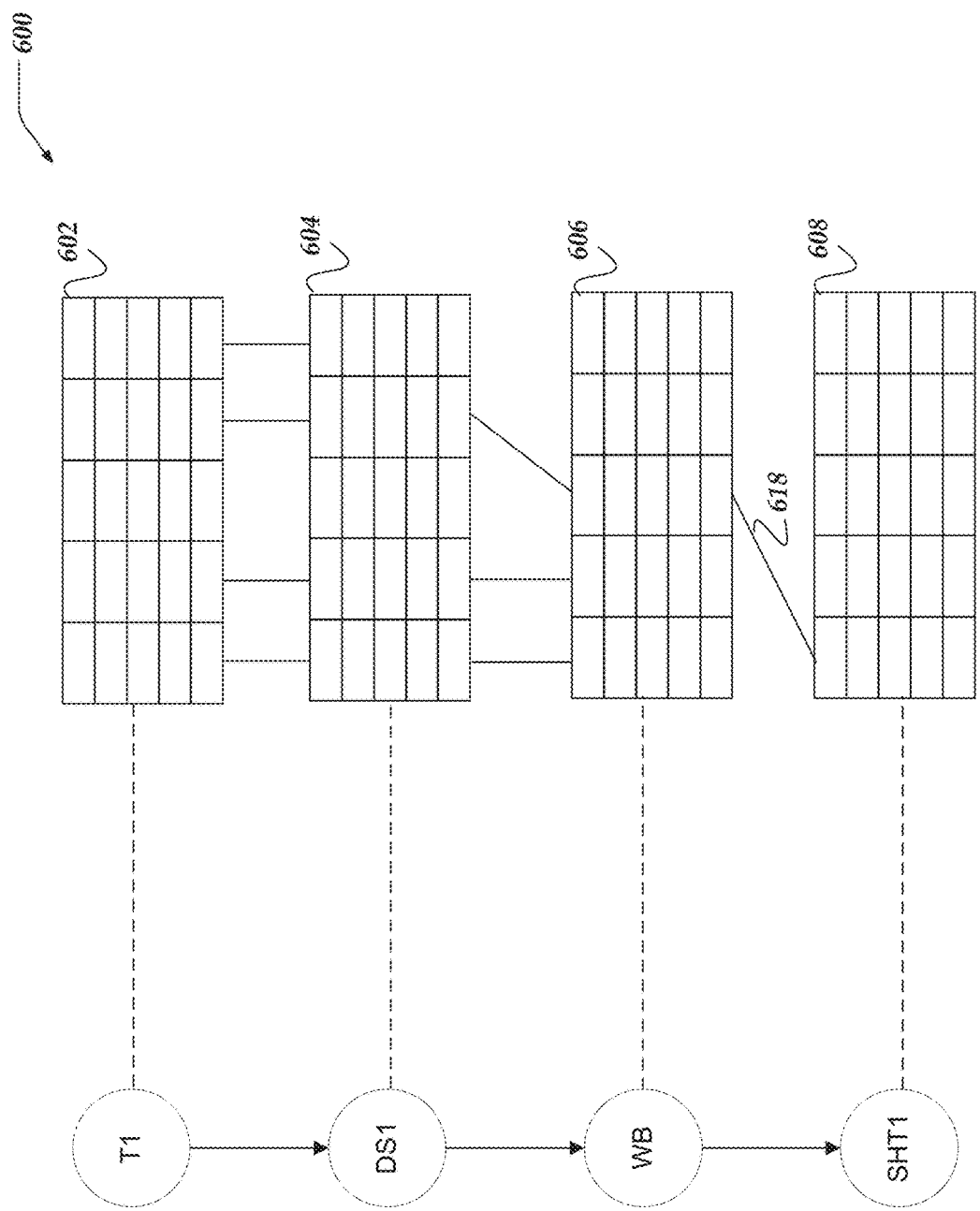
FIG. 6 illustrates a logical schematic of a portion of a system that shows dependencies in a data model in accordance with one or more of the various embodiments.

FIG. 6 illustrates a logical schematic of a portion of system 600 that shows dependencies in a data model in accordance with one or more of the various embodiments. In this example, system 600 comprises, data object 602, data object 604, data object 606, data object 608, or the like.

As described above, in one or more of the various embodiments, data objects in a data model may depend on other data objects in the same data model. In this example, data object 604, data object 606, and data object 608 depend on data object 602. Accordingly, in this example, data object 608 depends on data object 606, and so on. Note, while all of the data objects in this example are part of the same dependency tree that has data object 602 as its root, there may be other data objects in the same data model that have different or separate dependencies.

In one or more of the various embodiments, data objects in a data model may be dependent on one or more other data objects because they depend on one or more attributes of the other data objects. In FIG. 6, the lines connecting the columns in the data objects to other columns in the other data objects represent the dependencies between data objects at the attribute level. Accordingly, in this example, data object 602 has five columns which may be considered five attributes. In this example, the lines connecting data object 602 to data object 604 represent that data object 604 depends on four attributes of data object 602. Similarly, in this example, data object 606 depends directly on three attributes of data object 604 and indirectly on three attributes of data object 602. Also, similarly, in this example, data object 608 directly depends on one attribute from data object 606 and indirectly on one attribute of data object 606, data object 604, and data object 602. Thus, in this example, all of the data objects depend on one or more of their parents, however, the dependencies between data objects may be based on fewer than all of attributes. For example, line 618 represents that data object 608 depends on one attribute of data object 606.

In some embodiments, the dependencies between attributes or data objects in general may depend one or more functions, filters, transforms, or the like, that may be applied to attribute values as they are passed down to descendant data objects. For example, a table data object may include a timestamp attribute stored as Unix epoch timestamp. But, in this example, a dependent data source may have an attribute labeled Date that expects a conventional date representation rather than a Unix epoch timestamp. Accordingly, in this example, the Date attribute of the dependent data source may be associated with a transform action that converts the Unix epoch timestamp value provided by the parent table into a conventional date value that meets the requirements of the data source.

Figure 7:
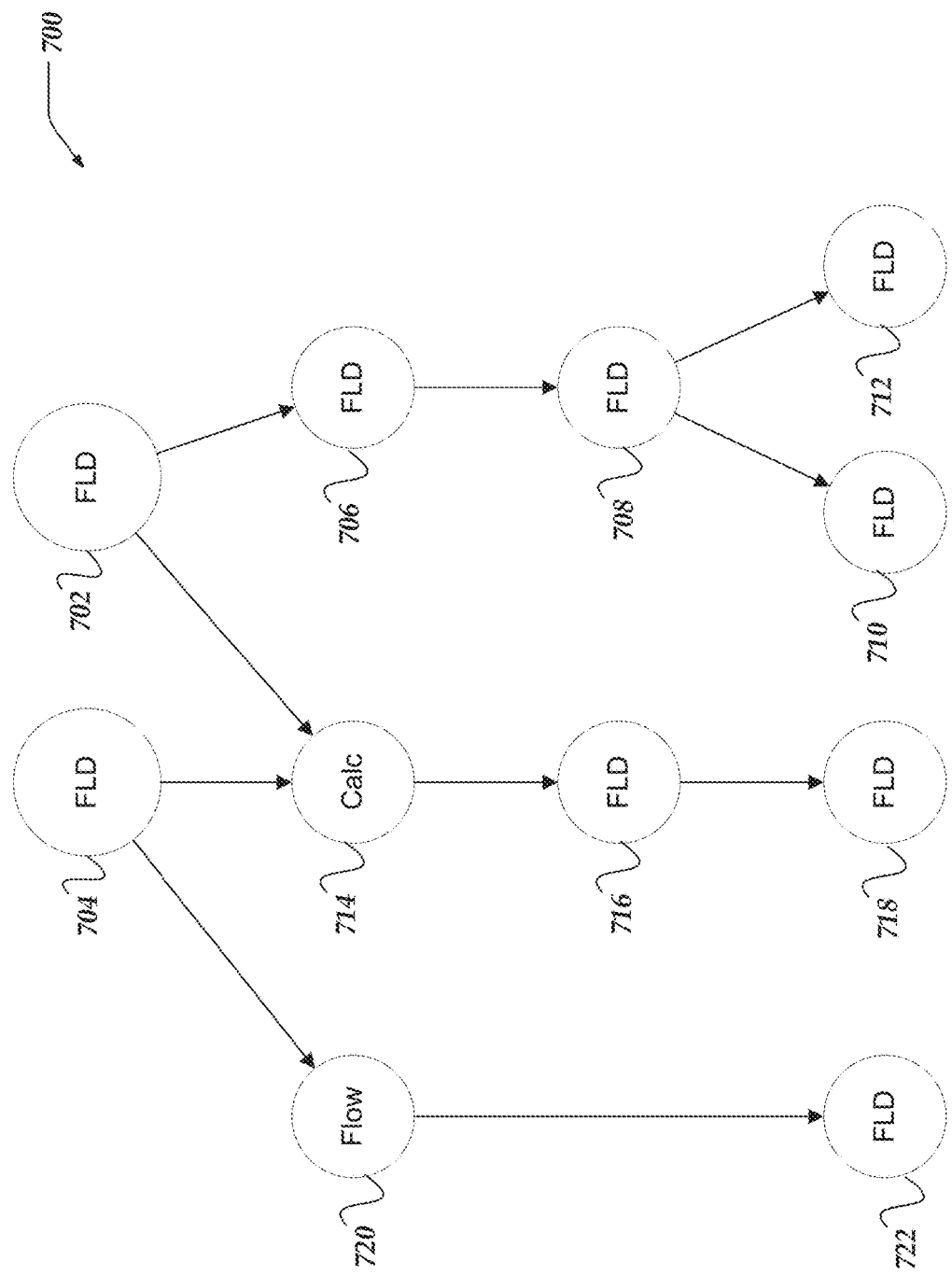
FIG. 7 illustrates a logical schematic of a portion of a dependency hierarchy that shows at least a portion of the logical nodes in a dependency hierarchy in accordance with one or more of the various embodiments.

FIG. 7 illustrates a logical schematic of a portion of dependency hierarchy 700 that shows at least a portion of the logical nodes in a dependency hierarchy in accordance with one or more of the various embodiments. As described above, dependency of data objects in data models may be represent as a dependency hierarchy based on the attributes of the involved data objects that contribute to the dependency relationships. Accordingly, attributes of data objects that represented in dependency hierarchies may be referred to as fields to distinguish them from attributes in general. In some embodiments, dependency hierarchy may include one or more nodes, such as, field nodes, flow nodes, calc nodes, or the like.

In one or more of the various embodiments, field nodes (e.g., fields) may represent values of attributes of data objects. For example, in some embodiments, a field corresponding to an attribute such as a column from a table from a source/originating database may provide the original value for a field. Whereas dependent field node may be considered to hold values propagated from one or more nodes that may be higher in the dependency hierarchy.

Further, in some embodiments, one or more nodes in a dependency hierarchy may represent calculations (e.g., calc nodes) that may be applied to a field value before it may be propagated to a descendant field. In some cases, for some embodiments, calc nodes may produce values from one or more field values that may have new or different semantic meanings than the input fields. For example, in some embodiments, calc nodes that are configured to compute a difference of two other field values to produce a new value for another field may be considered calc nodes. Accordingly, in some embodiments, calc nodes may be configured by users or visualization authors to perform arbitrary computations on values from one or more input fields to generate values that may be propagated to other fields.

Also, in some embodiments, flow nodes may represent transformation operations that may be applied to field values before they may be propagated to other fields. In one or more of the various embodiments, flow nodes may be employed to declare transformation operations that may be execute on field values without altering the semantic meaning of the field values. For example, flow nodes that correspond to operations, such as, text formatting, date formatting, truncating/rounding numerical values, or the like, may be considered flow nodes. Also, while not shown here, flow nodes may be configured to receive input values from more than one field node.

In this example, for some embodiments, dependency hierarchy 700 includes, field node 702, field node 704, field node 706, field node 708, field node 710, field node 712, field node 714, field node 716, field node 718, and field node 720. Also, in this example, dependency hierarchy 700 includes calc node 714 and flow node 720.

Accordingly, in some embodiments, lineage engines may be arranged to propagate values of field node 702 to field node 706, field node 708, field node 710 and field node 712 without modifying the value. In contrast, in this example, lineage engines may be arranged to provide values from field node 702 and field node 704 as inputs to calc node 714. Accordingly, in this example, for some embodiments, calc node 714 may propagate a new or modified value to field node 716. In some embodiments, the particular computation performed by calc node 714 may be considered to be a valid computation or transformation that may be likely to deviate from the semantic meaning of field node 704 or field node 702. Further, in this example, the value of field node 716 may be propagated to field node 718. Also, in this example, for some embodiments, the values from field node 704 may be provided to flow node 720. Accordingly, in some embodiments, flow node 720 may be configured to execute one or more transformations on the values from field node 704. As mentioned above, transformations performed by flow nodes may be considered to leave the semantic meaning of the value of field node 704 intact. Finally, in this example, the value generated by flow node 720 may be propagated to field node 722.

In one or more of the various embodiments, data management engines or lineage engines may be arranged to automatically enforce the rules or configuration defined in data models or dependency models. Accordingly, in some embodiments, users or other clients may employ the one or more fields in data objects or visualizations.

Note, one of ordinary skill in the art will appreciate that production dependency hierarchies may include many more fields nodes, calc nodes, flow nodes, or the like, than illustrated here. However, one of ordinary skill in the art will appreciate that dependency hierarchy 700 is at least sufficient for disclosing the innovations included herein.

Also, in some cases, for brevity or clarity, field nodes, calc nodes, flow nodes, or the like, may be referred to as fields, calcs, or flow in the context of dependency hierarchies.

Further, in some embodiments, dependency hierarchies may be an inherent part of data models. For example, rather than generating separate data structures for data models and dependency hierarchies, in some embodiments, lineage engines may be arranged to generate data models that include dependency hierarchy information. However, for brevity or clarity, herein dependency hierarchies may be described as being separate from their corresponding data model.

FIG. 8 illustrates a logical schematic of data object 800 that includes metadata information in accordance with one or more of the various embodiments. As described herein, in some embodiments, data models may be configured to include or represent various data objects. In some embodiments, one or more data objects may be based on one or more original data sources. such as, databases, spreadsheets, files, archives, or the like. Further, in some embodiments, data objects may include one or more synthetic objects comprised of data objects or data attributes from other data objects. For example, in some embodiments, data sources, workbooks, worksheets, or the like, may be data objects that may be comprised of one or more attributes from other data objects. As described above, data objects or data object attributes may be associated with metadata. For example, databases may be configured to provide database objects such as tables with one or more columns where each table is named and each column is named. Accordingly, in this example, the table names and column names may often be employed as data object names and data object attribute names in data models. However, in some cases, for some embodiments, database objects may be associated with metadata that may provide insight into the meaning, context, or purpose of the database objects rather than representing the value(s) of data object attributes.

In this example, for some embodiments, data object attribute 800 may be considered to represent one or more data structures that may be arranged to represent data object attributes in a data model. In this example, data object attribute 800 may be comprised of one or more inherent features represented here by features 802. In this example, for some embodiments, features represent various characteristics of attribute 800 that may be required or preferred for representing an attribute, such as, identity/label, value, datatype, or the like. One of ordinary skill in the art will appreciate that attributes may include more or fewer inherent features depending on the kind of data object or type of attribute. However, one of ordinary skill in the art will appreciate that features 802 is intended to logically represent the information that may be necessary to represent the value of the data object attribute. In this example, label, value, and type represent inherent features of data object 800. Thus, label, value, and type may be considered necessary features that enable the attribute to be used in a visualizations, reports, user interfaces, or the like.

In contrast, in this example, metadata 804 represents metadata that is associated with data object attribute 800. In this example, Description metadata is represented as providing a more detailed description of the purpose of the data object attribute 800. And, in this example, metadata Notes includes a narrative that describes a version of an application/schema that introduced this data object attribute. Clearly, in this example, features 802 enable display engines, or the like, to effectively display the value associated with data object attribute. However, metadata 804 enables users or visualization authors to gain an improved understanding of the context, purpose, or meaning regarding the purpose of the data object attribute. Accordingly, in this example, a display engine may enable users or visualization authors to view the metadata information to help inform when designing visualizations, reports, user interfaces, or the like, that may include data object attribute 800.

In some embodiments, metadata may include one or more of tags, data quality warnings, personally identifiable information (PII) detection (e.g., is a field containing sensitive information), data freshness, hierarchy hints/information (e.g., distances between various field nodes and calc nodes, or the like), certification/validation information (e.g., is the field trusted?), or the like.

Further, one of ordinary skill in the art that data objects or data object attributes may support a wide-variety of different types of metadata depending on the type of data, the source of the data, or the like. Accordingly, in some embodiments, lineage engines may be arranged to employ rules, instructions, libraries, or the like, provided via configuration information to process or recognize different types of metadata. Thus, in some embodiments, as new metadata types may be introduced for various data objects or data object attributes, lineage engines may employ the configuration information to account for the new metadata types or other local requirements or local circumstances.

Generalized Operations

FIGS. 9-13 represent generalized operations for metadata inheritance for data assets in accordance with one or more of the various embodiments. In one or more of the various embodiments, processes 900, 1000, 1100, 1200, and 1300 described in conjunction with FIGS. 9-13 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-13 may be used for metadata inheritance for data assets in accordance with at least one of the various embodiments or architectures such as those described in conjunction with FIGS. 4-8. Further, in one or more of the various embodiments, some or all of the actions performed by processes 900, 1000, 1100, 1200, and 1300 may be executed in part by data management engine 322, display engine 324, or lineage engine 326 running on one or more processors of one or more network computers.

Figure 9:
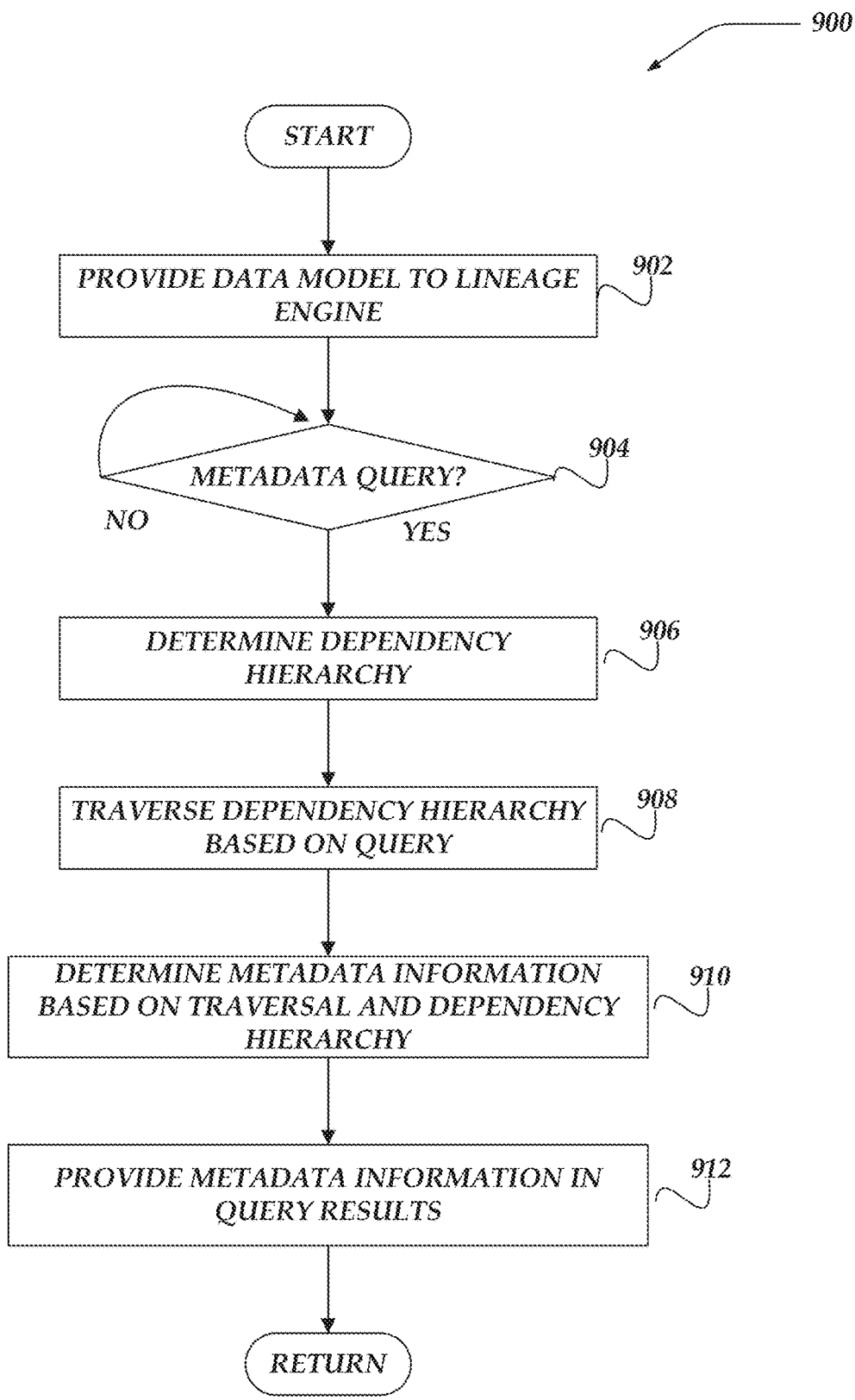
FIG. 9 illustrates an overview flowchart of a process for metadata inheritance for data assets in accordance with one or more of the various embodiments.

FIG. 9 illustrates an overview flowchart of process 900 for metadata inheritance for data assets in accordance with one or more of the various embodiments. After a start block, at start block 902, in one or more of the various embodiments, a data model may be provided to a lineage engine. As described above, a data management engine, display engine, or the like, may be arranged to generate data models that may be used by visualization authors or data administrators to create data objects that may be associated with various data model layers or data object types in the data model.

At decision block 904, in one or more of the various embodiments, if a metadata query may be provided to a lineage engine, control may be flow to block 906; otherwise, control may loop back to decision block 904. In one or more of the various embodiments, lineage engines may be arranged to integrate with various clients or client applications that may provide metadata queries. For example, if a client application, such as, a visualization authoring system attempts to display metadata for a data object to a visualization author, the client application may provide a metadata query to a lineage engine to provide the qualifying metadata, if any.

Also, in some embodiments, metadata query information may vary depending on the type of query. Further, in some embodiments, lineage engines may be arranged to support metadata queries may be provided using various well-known or customized query languages, such as, SQL, GraphQL, JSON, XML, Javascript, regular expressions, or the like, or combination thereof.

At block 906, in one or more of the various embodiments, the lineage engine may be arranged to determine dependency hierarchy based on the data model. In one or more of the various embodiments, lineage engines may be arranged to generate the dependency hierarchy for data model on-demand or in advance. For example, in some embodiments, if a lineage engines may be activated or associated with a data model, the lineage engines may be configured to automatically generate a dependency hierarchy that corresponds to the data model. In some embodiments, the dependency hierarchy may be inherently part of the data model. However, for brevity or clarity, herein dependency hierarchies are described separately from their corresponding data models.

At block 908, in one or more of the various embodiments, the lineage engine may be arranged to traverse the dependency hierarchy based on the query. In one or more of the various embodiments, metadata query information may include information that identifies one or more fields or portions of the dependency hierarchy that may be relevant the metadata query. For example, if the metadata query is asking for metadata for one field, the metadata query will identify this field as the anchor field for the metadata query.

At block 910, in one or more of the various embodiments, the lineage engine may be arranged to determine metadata information based on the traversal of the dependency hierarchy. In one or more of the various embodiments, the metadata query type and the query itself may inform lineage engines how to determine qualified metadata that answers the query. In some embodiments, determining qualified metadata information (e.g., inheritable metadata) may include traversing or other evaluating the nodes in a dependency hierarchy. For brevity or clarity actions related to evaluating the relationships or nodes represented by dependency hierarchies may be referred to as traversing the dependency hierarchy.

At block 912, in one or more of the various embodiments, the lineage engine may be arranged to provide the metadata information in the query results. In one or more of the various embodiments, different metadata queries or metadata query types may product different types of results. Some metadata query types may provide metadata information based on the first qualified (as defined by the query) metadata determined from the dependency hierarchy. In contrast, in some embodiments, other metadata queries or metadata query types may provide metadata for more than one field. For example, a query for chained metadata may provide qualify Next, in one or more of the various embodiments, control may be returned to a calling process.

Figure 10:
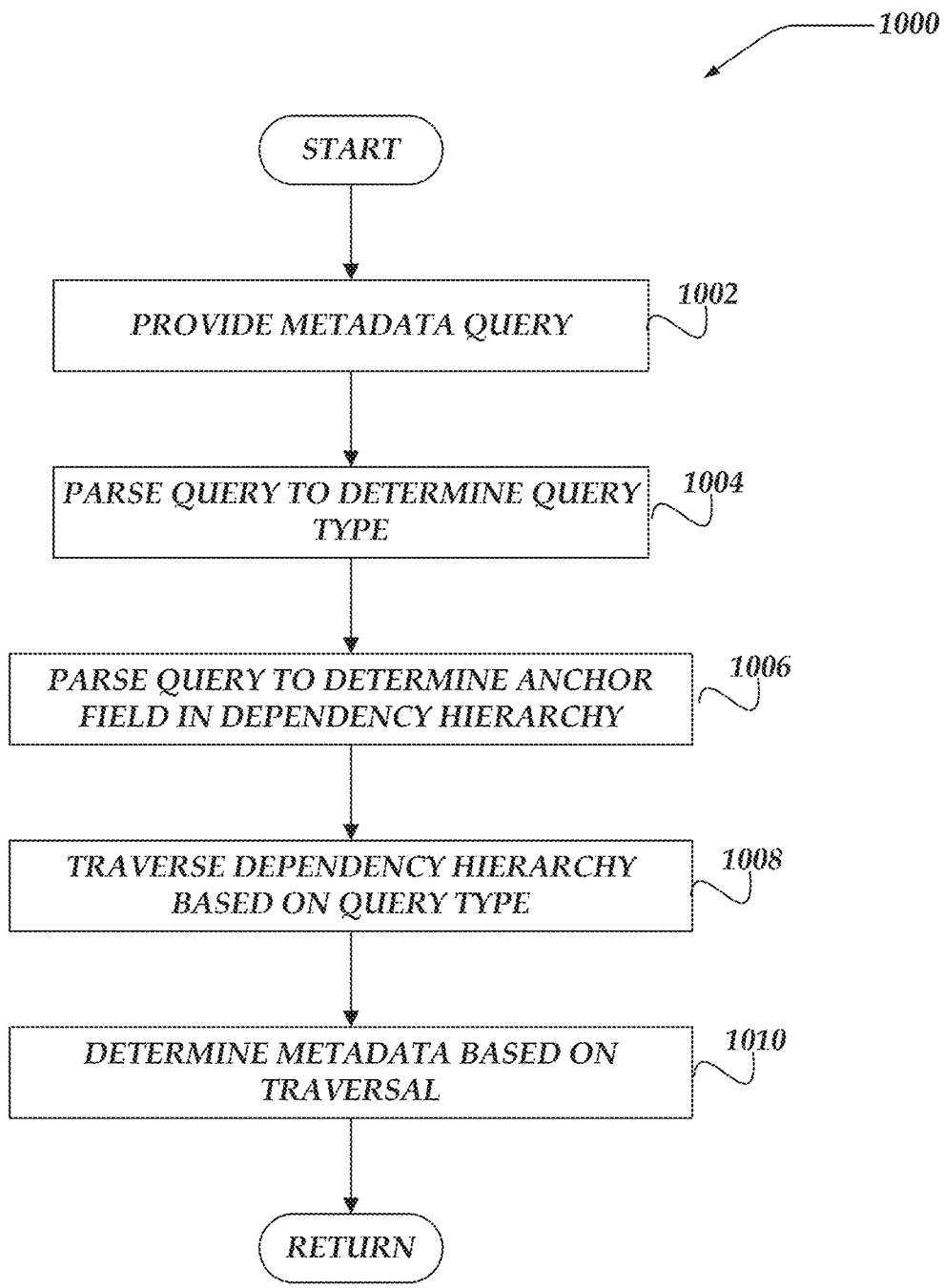
FIG. 10 illustrates a flowchart of a process for metadata inheritance for data assets in accordance with one or more of the various embodiments.

FIG. 10 illustrates a flowchart of process 1000 for metadata inheritance for data assets in accordance with one or more of the various embodiments. After a start block, at start block 1002, in one or more of the various embodiments, a metadata query may be provided to a lineage engine. In one or more of the various embodiments, lineage engines may be arranged to provide one or more APIs that enable client applications to provide one or more metadata queries. In one or more of the various embodiments, metadata query information may be provided as one or more parameters via the one or more APIs. In some embodiments, metadata query information may be provided as JSON objects that the lineage engine may parse to determine the metadata query information.

In one or more of the various embodiments, the one or more APIs may enable clients to declare a query type, one or more anchor fields in the dependency hierarchy, or the like. In some embodiments, lineage engines may be arranged to provide APIs that enable clients to provide additional parameters, such as, filters, security/authorization credentials, or the like.

At block 1004, in one or more of the various embodiments, the lineage engine may be arranged to parse the metadata query to determine the type of metadata query. In one or more of the various embodiments, lineage engines may be arranged to support one or more metadata query types. Accordingly, in some embodiments, the metadata query information may include direct indicators (e.g., labels), hints, or the like, that enable lineage engines to determine a query type.

In one or more of the various embodiments, lineage engines may be arranged to employ instructions, rules, libraries, or the like, provided via configuration information to identify different query types. Accordingly, in some embodiments, lineage engines may be arranged to support the addition of new or different query types as provided via configuration information.

At block 1006, in one or more of the various embodiments, the lineage engine may be arranged to parse the metadata query to determine one or more anchor fields in the dependency hierarchy.

In one or more of the various embodiments, an anchor field may be a field in the dependency hierarchy that the metadata query may be directed towards. In one or more of the various embodiments, lineage engines may be arranged to initiate the search for the requested metadata at the anchor field. In some embodiments, lineage engines may be arranged to support metadata queries with one or more anchor fields. Accordingly, in one or more of the various embodiments, queries that include more than one anchor field may execute queries for each anchor field included in the query.

In some embodiments, anchor field identifiers may be passed to the lineage engines via the query APIs that may be distinct from the query itself.

At block 1008, in one or more of the various embodiments, the lineage engine may be arranged to traverse the dependency hierarchy based on the query type. As described above, lineage engines may be arranged to generate a dependency hierarchy based on the relationships of data objects in the data model.

In one or more of the various embodiments, lineage engines may be arranged to answer the metadata query for the one or more anchor fields. Accordingly, in some embodiments, lineage engines may be arranged to traverse the dependency hierarchy to identify inheritable metadata values. Note, in some embodiments, the anchor fields may have their own version of the requested metadata. Thus, in some cases, depending on the query type, lineage engines may omit traversing the dependency hierarchy because the requested metadata value may be associated with the anchor fields. In contrast, if the anchor fields are not associated with the requested metadata, lineage engines may traverse the dependency hierarchy to determine if there may be inheritable metadata values that could answer the query.

In one or more of the various embodiments, lineage engines may be arranged to execute one or more actions depending on the query type. In one or more of the various embodiments, lineage engines may be arranged to determine the one or more actions based on rules, instructions, libraries, or the like, provided by configuration information to account for local requirements or local circumstances.

For example, in some embodiments, some query types may be arranged to provide a response the may be limited to the first metadata value that can answer the question. Also, for example, in some embodiments, other query types may be directed to more information, such as, a report that identifies each field in the dependency hierarchy that may be associated with the inheritable metadata value. For example, in some embodiments, queries of the type FIRST may return the first valid value for the metadata as determined by the traversal through the dependency hierarchy. Likewise, in some embodiments, queries of the type CHAIN may return the requested metadata values for the entire portions of the dependency hierarchy that were visited in the traversal.

At block 1010, in one or more of the various embodiments, the lineage engine may be arranged to determine metadata information based on the traversal of the dependency hierarchy and query type. As mentioned briefly above, the type of information may vary depending on the query type and query information. Some queries may return metadata values for one field while other metadata queries may return metadata values one or more fields. Similarly, in some embodiments, some queries may return aggregate values, counts, true/false (e.g., existence), or the like. Also, in some embodiments, lineage engines may be arranged to report null values or errors if the requested query cannot be resolved. In some cases, lineage engines may be unable to the metadata value for a field because the inheritance rules associated with query may not provide a valid answer. For example, in some embodiments, if a field is dependent on two fields, lineage engines may be disabled from automatically determining how to propagate the metadata. Thus, in this example, a null value may be reported. Though, in this example, some query types may provide each alternative result rather than failing to provide one result.

Further, in some embodiments, one or more data objects or corresponding fields in the dependency hierarchy may be associated with one or more permission or privilege designations. Accordingly, in some embodiments, lineage engines may be arranged to validate that the user or client submitting the metadata query may be authorized to view or access the fields associated with metadata or inheritable metadata. In some embodiments, lineage engines may be arranged to apply one or more information security policies depending on the metadata queries, metadata query types, data model/objects, or the like, associated with the query results. In some embodiments, lineage engines may be arranged to employ rules, instructions, or the like, provided by configuration information to determine permission evaluation or user authorization related to metadata query results.

Next, in one or more of the various embodiments, control may be returned to a calling process.

Figure 11:
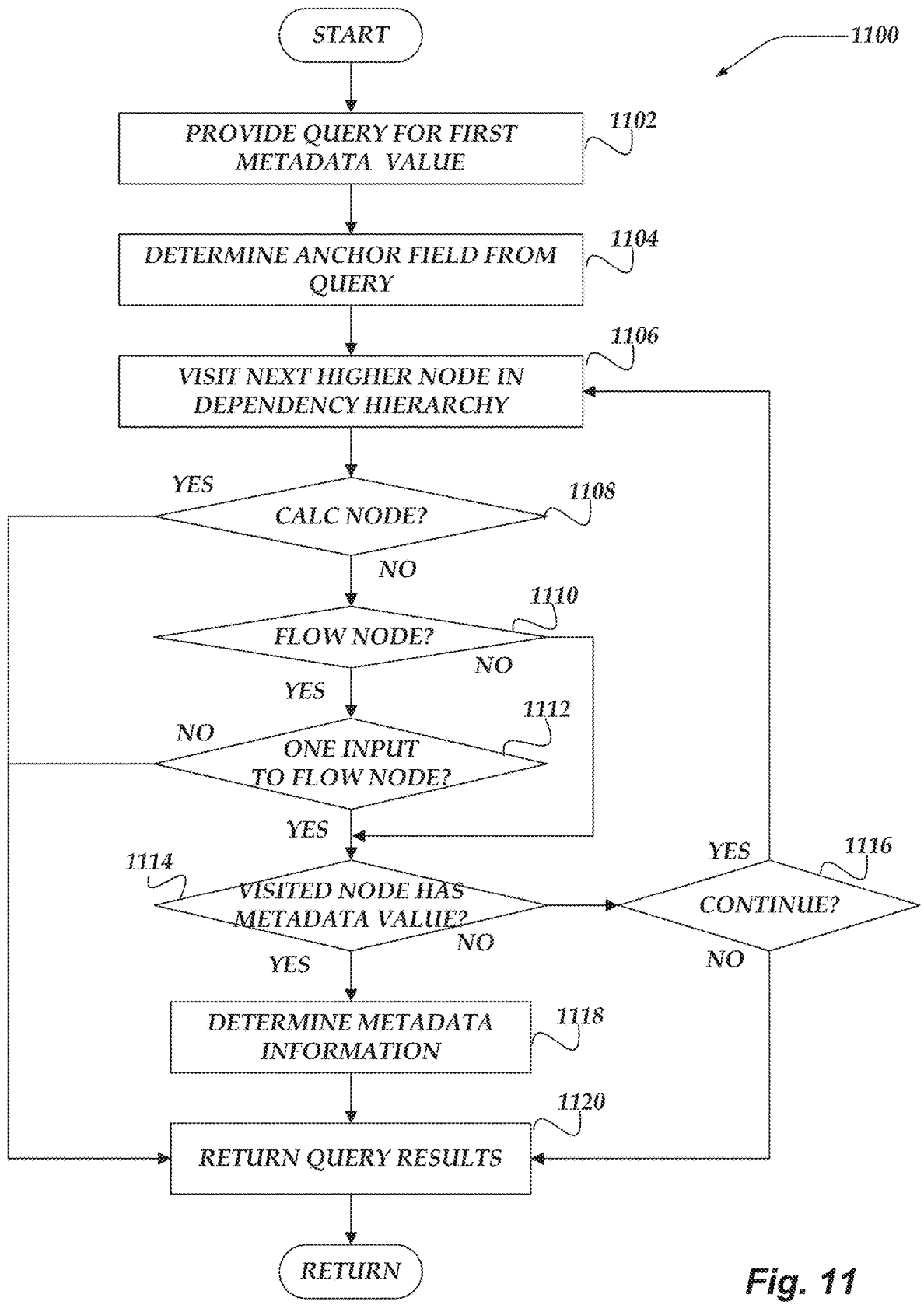
FIG. 11 illustrates a flowchart of a process for metadata inheritance for data assets in accordance with one or more of the various embodiments.

FIG. 11 illustrates a flowchart of process 1100 for metadata inheritance for data assets in accordance with one or more of the various embodiments. After a start block, at start block 1102, in one or more of the various embodiments, a metadata query for a first metadata value may be provided to a lineage engine. As described above, in some embodiments, lineage engines may be arranged to support various query types. In one or more of the various embodiments, the available/authorized query types and the rules, instructions, grammar, or the like, for declaring queries for a particular query type may vary depending on the query type. For example, in some embodiments, lineage engines may be arranged to enable client applications to provide a name or symbol that indicates the query type. In other embodiments, lineage engines may be arranged to infer the query type from the query information. For example, if the metadata query may be provided using SQL or GraphQL, lineage engines may be arranged to parse the SQL or GraphQL to determine the query type.

Accordingly, in some embodiments, lineage engines may be arranged to determine if the metadata query may be requesting the lineage engines to determine the first metadata value for one or more anchor fields. For example, in some embodiments, the query information may include a value such as 'FIRST' indicating that the client is requesting the first qualifying metadata value for the anchor field, if any. In this example, the FIRST query type may be arranged to return the first qualifying/valid value for a specified metadata. For example, if the query is requesting a value of the metadata 'description' for the anchor field, the lineage engines may execute the query to find the first value for 'description' for the anchor object based on the dependency hierarchy. Thus, if the anchor field has description metadata associated with the anchor field, that description information may satisfy the query. In contrast, if the anchor field does not have description metadata, the lineage engines may be arranged to traverse the dependency hierarchy to determine if there may be inheritable metadata associated with other fields that may satisfy the query.

At block 1104, in one or more of the various embodiments, the lineage engine may be arranged to determine an anchor field based on the query. In one or more of the various embodiments, the anchor field may be considered the main subject of the query. Accordingly, in some embodiments, the query information may expressly define the anchor field. In some embodiments, if multiple anchor fields may be included in the query information for a FIRST query type, the lineage engines may be arranged to find the first qualifying metadata values for each anchor field.

At block 1106, in one or more of the various embodiments, the lineage engine may be arranged to visit each next higher node in the dependency hierarchy. In one or more of the various embodiments, lineage engines may be arranged to traverse up the dependency hierarchy, starting at the anchor fields. In one or more of the various embodiments, lineage engines may be arranged to continue the traverse until the query has reached a result or produced an error.

In some embodiments, lineage engines may start traversals of dependency hierarchies at the one or more anchor fields declared in metadata queries.

At decision block 1108, in one or more of the various embodiments, if the visited node may be a calc node, control may flow to block 1120; otherwise, control may flow to decision block 1110. As described above, in some cases, for some embodiments, a field node in the dependency hierarchy may be dependent on one or more calc nodes. As described above, calc nodes may represent one or more computations (e.g., calculations) that may be performed on one or more other field values to produce new or modified values.

In some cases, the actions performed for the calc nodes may produce values that have semantic meaning that may be different than the semantic meaning of the source/input fields. Accordingly, in some embodiments, the meaning or context of metadata associated with fields that feed into calc nodes may not be relevant to the values produced by calc node. Thus, in some embodiments, it may be disadvantageous to propagate such metadata to fields/nodes further down the dependency hierarchy because the semantic meaning of the metadata may no longer be consistent with the field values.

Accordingly, in some embodiments, if a calc node is encountered during the traversal of the dependency hierarchy before other qualifying metadata may be discovered, the query for a first metadata value may not be answered.

At decision block 1110, in one or more of the various embodiments, if the visited node may be a flow node, control may flow to decision block 1112; otherwise, control may flow to block 1120. As described above, for some embodiments, flow nodes may be similar to calc nodes in that they may represent transformations to field values that may be execute for the value may be passed down to descendant fields. However, in contrast to calc nodes, transformations associated with flow nodes may be assumed to retain the semantic meaning of the transformed fields. Accordingly, in some embodiments, visiting a flow node in the traversal of the dependency hierarchy may not terminate the query as do calc nodes.

At decision block 1112, in one or more of the various embodiments, if the visited flow node may have one input, control may flow to decision block 1114; otherwise, control may flow to block 1120. As described above, in some embodiments, flow nodes may be configured to have more than input nodes. In some embodiments, if the flow node has more than one input nodes, lineage engines may be disabled from determining which metadata to propagate down to the anchor fields because the lineage engines because it cannot select from among the one or more fields. Accordingly, in some embodiments, visiting a flow node that has more than one input node may terminate the traversal and the execution of the query.

At decision block 1114, in one or more of the various embodiments, if the visited node has metadata information that matches the query, control may flow block 1118; otherwise, control may flow to decision block 1116. For example, if the query is requesting the first 'description' metadata for an anchor field, if the visited field node has a value for 'description' the query may be satisfied. In contrast, for some embodiments, if the visited field does not have a value for the requested metadata, the traversal up the dependency hierarchy may continue.

At decision block 1116, in one or more of the various embodiments, if the traversal of the dependency hierarchy may continue, control may loop back to 1106; otherwise, control may flow to block 1120. In one or more of the various embodiments, lineage engines may be arranged to continue the traversal up the dependency hierarchy until all ancestor nodes of the anchor field may be visited unless the query otherwise terminates by encountering qualifying metadata, a calc node, or a multi-input flow node. Note, the traversal termination conditions may vary depending on the metadata query or metadata query type.

Further, in some embodiments, lineage engines may be arranged to employ various safety/performance measures to restrict the amount of time or resources consumed by the execution of a query. Accordingly, in some embodiments, lineage engines may be arranged to terminate queries if they take too long. Thus, in some embodiments, lineage engines may be arranged to determine a timeout value from configuration information or the query itself. Also, in some embodiments, lineage engines may be arranged to limit queries by restricting the total number of nodes in the dependency hierarchy that may be visited during a query. For example, in some embodiments, lineage engines may be configured to limit the traversal of the dependency hierarchy by restricting the number of nodes that may be visited to 20,000 nodes, or the like. Note, in some embodiments, lineage engines may be arranged to determine timeout values or traversal/node-count restrictions based on configuration information to account for local requirements or local circumstances. Further, in some embodiments, different types of queries may have different timeouts or node-visit limits.

At block 1118, in one or more of the various embodiments, the lineage engine may be arranged to determine the metadata information for the visited node. In one or more of the various embodiments, the metadata requested by the query may be determined from the first visited field node that may be associated with the requested metadata information. In some embodiments, this may be the anchor field if the anchor field has the requested metadata information. Otherwise, in some embodiments, the metadata information may be determined from a field node in the dependency hierarchy that may be an ancestor of the anchor field. Note, for the FIRST query type describe here, the metadata value may be obtained from the first field node that has a value for the metadata requested by the query.

At block 1120, in one or more of the various embodiments, the lineage engine may be arranged to return the query results. In one or more of the various embodiments, lineage engines may be arranged to return result information that includes a value for the requested metadata if it could be determined. Otherwise, in some embodiments, a result that indicates that the requested metadata could not be determined may be provided. In some embodiments, the result information may indicate why the requested metadata value was not determined. Accordingly, in some embodiments, the result information may indicate if a calc node or multi-input flow node was encountered. Also, in some embodiments, the result information may indicate that none of the field nodes in the dependency hierarchy included the requested metadata.

Further, mentioned above and described in more detail below, lineage engines may be arranged to modify the metadata query results based on information security considerations, such as, field/data access restrictions, user roles, client types, client sources, or the like.

In one or more of the various embodiments, lineage engines may be arranged to provide the result information synchronously or asynchronously to the client that provided the query. In some embodiments, the result information may be returned in a API parameter or return value. In some embodiments, the result information may be comprised of one or more individual parameters in various data structures consistent with the API being employed. For example, in some cases, the result information may be provide as one or more JSON objects, XML files, HTTP responses, or the like. In some embodiments, lineage engines may be arranged to support more than one protocol or format for returning query result information to the clients that provided the query information.

Next, in one or more of the various embodiments, control may be returned to a calling process.

Figure 12:
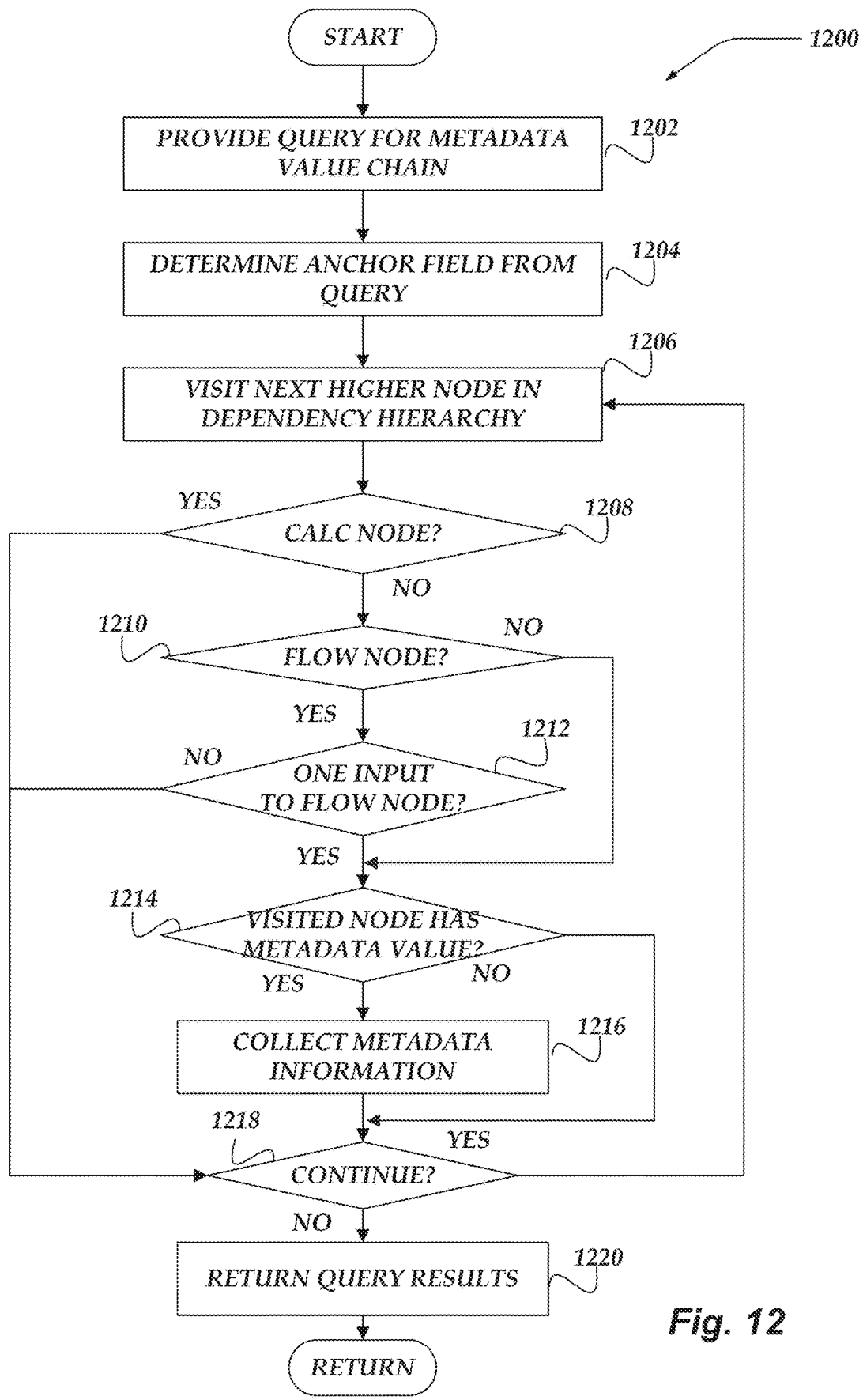
FIG. 12 illustrates a flowchart of a process for metadata inheritance for data assets in accordance with one or more of the various embodiments.

FIG. 12 illustrates a flowchart of process 1200 for metadata inheritance for data assets in accordance with one or more of the various embodiments. After a start block, at start block 1202, in one or more of the various embodiments, a metadata query for chained metadata information may be provided to a lineage engine. In this example, chained metadata information metadata queries request the metadata information for some or all of the ancestors that an anchor field may be dependent on. Otherwise, providing the query information for chained metadata queries may be considered to similar to as described for block 1102.

Also, in one or more of the various embodiments, queries for chained metadata may be a considered a query type. Accordingly, in some embodiments, determining qualified metadata or other results associated with the query may vary from other query types.

At block 1204, in one or more of the various embodiments, the lineage engine may be arranged to determine an anchor field based on the query. See, the description for block 1104.

At block 1206, in one or more of the various embodiments, the lineage engine may be arranged to visit a next higher node in the dependency hierarchy. See, the description for block 1106.

At decision block 1208, in one or more of the various embodiments, if the visited node may be a calc node, control may flow to decision block 1218; otherwise, control may flow to decision block 1210. For reasons similar as described for FIRST query types illustrated by FIG. 11, encountering a calc node may terminate a traversal up the dependency hierarchy. However, in some embodiments, chained metadata queries may traverse multiple branches in the dependency hierarchy. Accordingly, in some cases, for some embodiments, encountering a calc node while executing chained metadata queries may not end the query execution as described above for FIRST metadata queries.

At decision block 1210, in one or more of the various embodiments, if the visited node may be a flow node, control may flow to decision block 1212; otherwise, control may flow to decision block 1214. Encountering a flow node during a traversal up the dependency hierarchy may be considered similar as described for FIRST query types illustrated by FIG. 11.

At decision block 1212, in one or more of the various embodiments, if the visited flow node may have one input, control may flow to decision block 1114; otherwise, control may flow to decision block 1218. For reasons similar as described for FIRST query types illustrated by FIG. 11, lineage engines may be arranged to terminate a traversal up the dependency hierarchy if a multi-input flow node may be encountered during the traversal. However, in some embodiments, chained metadata queries may traverse multiple branches in the dependency hierarchy. Accordingly, in some cases, for some embodiments, encountering a multi-input flow node while executing chained metadata queries may not end the query execution as described above for FIRST metadata queries.

At decision block 1214, in one or more of the various embodiments, if the visited node has the requested metadata information, control may flow to block 1216; otherwise, control may flow to decision block 1218. Similarly, as described above for process 1100, lineage engines may be arranged to determine if metadata information associated with visited fields includes metadata values that may be responsive to the query.

At block 1216, in one or more of the various embodiments, the lineage engine may be arranged to determine the metadata information for the visited block. Similar as described above for process 1100, lineage engines may be arranged to collect metadata values that may be responsive the query from the visited field node. However, in contrast to process 1100, lineage engines may be arranged to collect metadata values from each visited field node rather than terminating the query after finding the first field node associated with metadata that satisfies the query. Accordingly, in some embodiments, lineage engines may be arranged to collect qualifying metadata values from more than one field node encountered during the traversal up the dependency hierarchy.

At decision block 1218, in one or more of the various embodiments, if the traversals of the dependency hierarchy should continue, control may loop back to block 1206; otherwise, control may flow to block 1220. In one or more of the various embodiments, lineage engines may be arranged to continue traversals up the dependency hierarchy along more than one branch or path depending on the configuration of the dependency hierarchy. Also, similar to process 1100, lineage engines may be arranged to enforce one or more safety/performance protections, such as, timeouts or node count limits. See, above description for process 1100.

At block 1220, in one or more of the various embodiments, the lineage engine may be arranged to return the query results. In one or more of the various embodiments, lineage engines may be arranged to provide chained metadata information that may have been encountered during the traversal of the dependency hierarchy. In some embodiments, results for chained metadata queries may provide the client information about the anchor field as well as some or all of its ancestors in the dependency hierarchy. Otherwise, in some embodiments, providing query result information may be considered similar as described above for block 1120, including modifying the metadata query results based on information security considerations, such as, field/data access restrictions, user roles, client types, client sources, or the like.

Next, in one or more of the various embodiments, control may be returned to a calling process.

Figure 13:
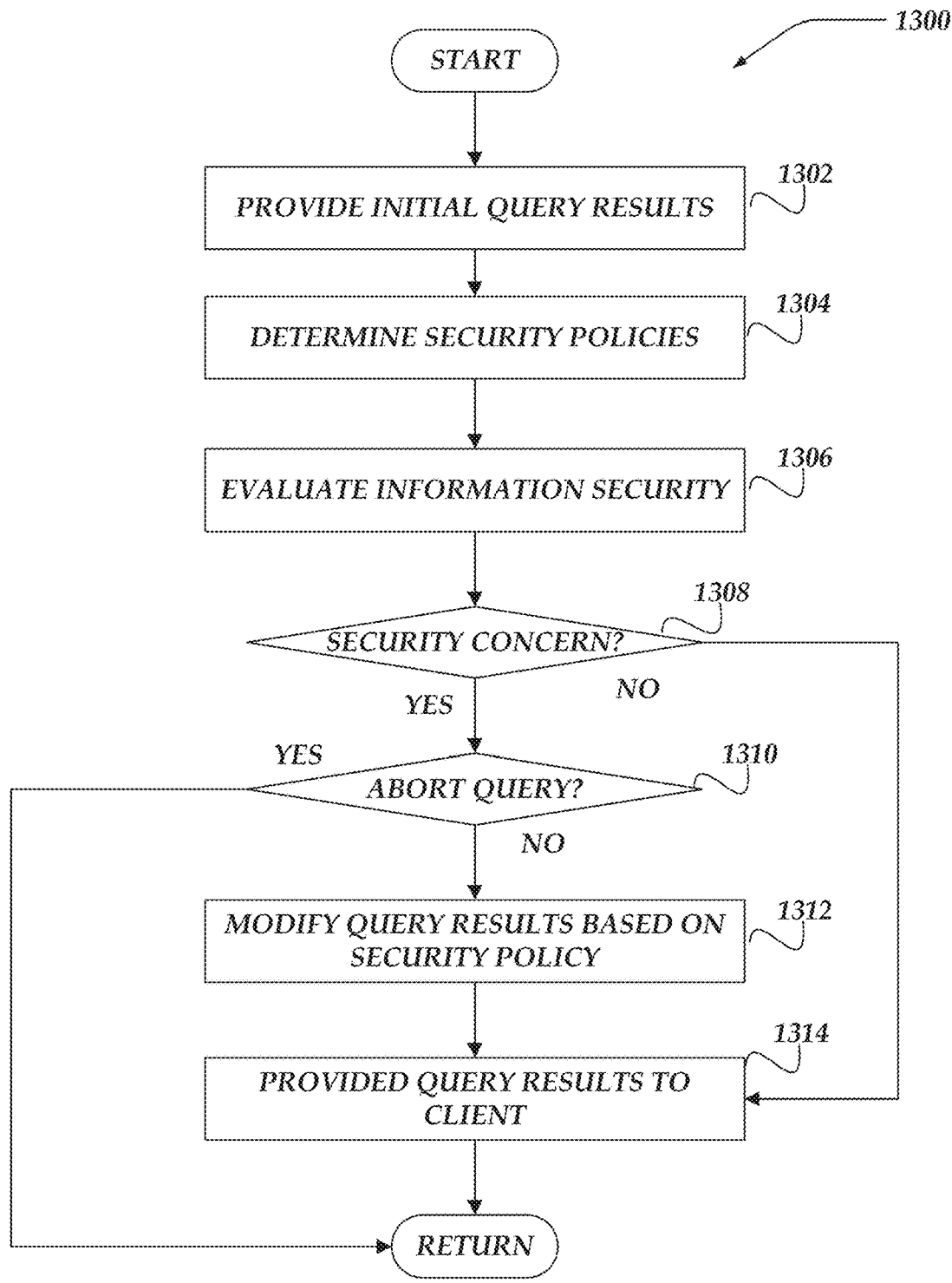
FIG. 13 illustrates a flowchart of a process for information security associated with metadata inheritance for data assets in accordance with one or more of the various embodiments.

FIG. 13 illustrates a flowchart of process 1300 for information security associated with metadata inheritance for data assets in accordance with one or more of the various embodiments. After a start block, at start block 1302, in one or more of the various embodiments, as described above, lineage engines may be arranged to generate metadata query results based on the execution of metadata queries.

At block 1304, in one or more of the various embodiments, lineage engines may be arranged to determine the relevant security policies associated with the metadata query results.

In one or more of the various embodiments, one or more fields in the dependency hierarchy or corresponding data objects may be associated with permissions or access rules that may enforced by lineage engines.

In one or more of the various embodiments, lineage engines may be arranged to apply one or more security policies that may be associated with one or more users, clients, data source, data objects, or the like, to prevent unauthorized access to protected/sensitive information.

In some embodiments, lineage engines may be arranged to determine the security policies associated with the metadata query or metadata query results. In some embodiments, lineage engines may be arranged to determine security policies based on configuration information enabling different organizations or data owners to establish global or local security policies tailored to local requirement or local circumstances. For example, in some embodiments, security policies may be configured differently depending on various factors, including, query type, data source, data object, client, client type, user, or the like. Accordingly, in some embodiments, lineage engines may be arranged to determine security policies based on rules, maps, instructions, or the like, for selecting the security policy based on configuration information to account for local circumstances or local requirements.

In one or more of the various embodiments, lineage engines may be arranged to execute/evaluate one or more rules, conditions, instructions, or the like, that may be defined in security policies.

At block 1306, in one or more of the various embodiments, lineage engines may be arranged to evaluate the metadata query results in view of the determined security policy.

At decision block 1308, in one or more of the various embodiments, if a security policies issue may be determined, control may flow to decision block 1310; otherwise control may flow to block 1314.

At decision block 1310, in one or more of the various embodiments, if the metadata query should be aborted, control may be returned to a calling process; otherwise, control may flow to block 1312.

In some cases, for some embodiments, security policy may indicate that the metadata query should be immediately aborted or rejected such that no information or metadata query results may be returned to the client that provided the query. For example, if the security violation is determined to be associated malicious actors, the security policy may be act like the request has been ignored rather than responding with any results.

At block 1312, in one or more of the various embodiments, lineage engines may be arranged to modify the metadata query results as per the determined security policy. In some embodiments, the lineage engines may be configured to hide/obscure one or more portions of the metadata query results, such as, metadata values, field names, data source, or the like.

For example, in some embodiments, lineage engines may be configured remove results associated restricted/protected fields and leave accessible fields in the results. In some cases, non-sensitive information, such as, data type, data source, hierarchy information, or the like, may be included in the metadata query results while restricted information is removed.

In one or more of the various embodiments, the particular filtering or obfuscation of the initial metadata query results may depend on the rules, conditions, instructions, or the like, declared in the determined security policy being enforced.

At block 1314, in one or more of the various embodiments, lineage engines may be arranged to provide the modified metadata query results to the client/user that provided the metadata query.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Use Cases

FIG. 14 illustrates a logical representation of query 1400 for metadata inheritance for data assets in accordance with one or more of the various embodiments. In this example, query 1400 comprises metadata query 1402 and metadata query results 1404.

In this example, the query type of 'FIRST' is declared in metadata query 1402. In this example, this type of query may be considered to be arranged to return the first inheritable metadata that matches the query. In this example, the metadata query is requesting a metadata attribute named 'description' for anchor field 'field C'

Accordingly, in this example, result 1404 indicates that metadata description for field C may be inherited from field B. It shows the metadata 'description' associated directly with 'field C' is null (because it has not been defined for the field). Thus, in this example, the metadata is inherited from 'field B' with a value of "BBBBB"

FIG. 15 illustrates a logical representation of query 1500 for metadata inheritance for data assets in accordance with one or more of the various embodiments. In this example, query 1500 comprises metadata query 1502 and metadata query results 1504.

In this example, the query type of 'CHAIN' is declared in metadata query 1402. In this example, this type of query may be considered to be arranged to return the portion of the dependency hierarchy (e.g., a sub-tree) that includes metadata of fields that may be ancestors of anchor field 'field C'. Thus, two metadata values are returned, one for each field in the dependency hierarchy that may be determined to be ancestors of the anchor field (field C).

Figure 16:
FIG. 16 illustrates a logical represent of metadata query results for metadata inheritance in accordance with one or more of the various embodiments.

FIG. 16 illustrates a logical represent of metadata query result 1600 for metadata inheritance in accordance with one or more of the various embodiments. In this example, metadata query result 1600 represent a result that did discover inheritable metadata. Accordingly, in this example, the metadata attribute 'description' is reported as being null (e.g., empty). In the examples, described above (e.g., process 1100), null results, such as, metadata query result 1600 may be produced if a calc node or multi-input flow node may be encountered in the dependency hierarchy.

What is claimed as new and desired to be protected by Letters Patent of the United States is:

1. A method, comprising:
at a computer system in communication with a display, the computer system having one or more processors and memory storing one or more programs, wherein the one or more programs are configured to be executed by the one or more processors, the one or more programs including instructions for:
for selected stored content including a first plurality of data assets, obtaining a hierarchy model that includes one or more edges that represent dependency relationships between data assets in the first plurality of data assets, and between data assets in the first plurality of data assets and one or more data assets in a second plurality of external data assets, wherein data assets in the first plurality of data assets and the second plurality of external data assets include one or more of workbooks, data sources, and flows that are represented as one or more field nodes, one or more calculation nodes, or one or more flow nodes in the hierarchy model; and
receiving a query for obtaining lineage metadata for a selected anchor data asset in the first plurality of data assets, wherein the selected anchor data asset is represented as an anchor field in the hierarchy model;
in response to the query for obtaining lineage data for the selected anchor data asset, traversing the hierarchy model upwards from the anchor field based on the query, wherein the traversing is performed by a lineage engine corresponding to a stored computer program and the traversing includes:
in response to visiting one or more field nodes in the hierarchy model, collecting one or more values of the metadata that correspond to the visited field node, wherein the traversal is terminated based on a type of the query;
in response to visiting a calculation node, terminating the traversal of the hierarchy model associated with the visited calculation node; and
in response to visiting a flow node that is dependent on two or more other nodes in the hierarchy model, terminating the traversal of the hierarchy model associated with the visited flow node; and
displaying on the display, in a graphical user interface, the one or more collected values of the metadata that are inheritable to the anchor field.

2. The method of claim 1, wherein terminating the traversal based on the type of the query further comprises:
in response to the query being a first query type, terminating the traversal of the hierarchy model in response to visiting a first ancestor field node of the anchor field that is associated with a value of the metadata, wherein the value of the metadata collected from the first ancestor field node is provided as the metadata for the anchor field.

3. The method of claim 1, wherein terminating the traversal based on the type of the query further comprises:
in response to the query being a second query type, performing further actions, including:
visiting each field node in the hierarchy model that is an ancestor of the anchor field, wherein visiting an intervening calculation node or an intervening multi-input flow node terminates the traversal of the hierarchy model; and
collecting one or more values of the metadata for each visited field node that is an ancestor of the anchor field, wherein the one or more values of the metadata is sorted based on the one or more dependency relationships in the hierarchy model that correspond to the anchor field and the one or more visited ancestor field nodes.

4. The method of claim 1, wherein traversing the hierarchy model further comprises:
determining one or more security policies associated with the hierarchy model based on the query and a client that provided the query;
comparing the one or more visited field nodes and the client to the one or more security policies;
determining one or more restricted field nodes in the hierarchy model based on the comparison, wherein the one or more security policies exclude the client from accessing information associated with the one or more restrict field nodes; and
excluding one or more values of the metadata that are associated with the one or more restricted field nodes from the response to the query, wherein one or more of an identifier or data type associated with the one or more restricted field nodes, is included in the response to the query.

5. The method of claim 1, further comprising:
determining one or more of a timeout value or a node visitation limit value based on one or more of a query type, or the query;
in response to a time to provide the response to the query exceeding the timeout value, terminating the traversal of the hierarchy model and providing a partial response to the query that includes the one or more collected values of the metadata; and
in response to a number of nodes visited in the hierarchy model exceeding the node visitation limit value, terminating the traversal of the hierarchy model and providing a partial response that includes the one or more collected values of the metadata.

6. The method of claim 1, further comprising:
determining the type of query based on information provided with the query;
determining one or more conditions for terminating the traversal based on the type of query; and
determining response information to include in the response to the query based on the type of query, wherein the response information may include one or more of one or more values of the metadata, one or more aggregated values based on the one or more values of the metadata, or an execution of one or more other actions defined by the type of query.

7. The method of claim 1, further comprising:
in response to the anchor field being associated with a value of the metadata, including the value of the metadata associated with the anchor field in the response to the query; and
in response to the value of the metadata being absent from the anchor field, providing the value of the metadata associated with an ancestor field node in the hierarchy model that is nearest the anchor field in the response to the query.

8. A computer system, comprising:
a display;
one or more processors; and
memory storing one or more programs, wherein the one or more programs are configured to be executed by the one or more processors, the one or more programs including instructions for:
one or more processors that execute instructions that perform actions, including:
for selected stored content including a first plurality of data assets, obtaining a hierarchy model that includes one or more edges that represent dependency relationships between data assets in the first plurality of data assets and between data assets in the first plurality of data assets and one or more data assets in a second plurality of external data assets, wherein data assets in the first plurality of data assets and the second plurality of external data assets include one or more of workbooks, data sources, and flows that are represented as one or more field nodes, one or more calculation nodes, or one or more flow nodes in the hierarchy model;
receiving a query for obtaining lineage metadata for a selected anchor data asset in the first plurality of data assets, wherein the selected anchor data asset is represented as an anchor field in the hierarchy model;
in response to the query for obtaining lineage data for the selected anchor data asset, traversing the hierarchy model upwards from the anchor field based on the query, wherein the traversing is performed by a lineage engine corresponding to a stored computer program and the traversing includes:
in response to visiting one or more field nodes in the hierarchy model, collecting one or more values of the metadata that correspond to the visited field node, wherein the traversal is terminated based on a type of the query;
in response to visiting a calculation node, terminating the traversal of the hierarchy model associated with the visited calculation node; and
in response to visiting a flow node that is dependent on two or more other nodes in the hierarchy model, terminating the traversal of the hierarchy model associated with the visited flow node; and
displaying on the display, in a graphical user interface, the one or more collected values of the metadata that are inheritable to the anchor field.

9. The computer system of claim 8, wherein terminating the traversal based on the type of the query further comprises:
in response to the query being a first query type, terminating the traversal of the hierarchy model in response to visiting a first ancestor field node of the anchor field that is associated with a value of the metadata, wherein the value of the metadata collected from the first ancestor field node is provided as the metadata for the anchor field.

10. The computer system of claim 8, wherein terminating the traversal based on the type of the query further comprises:
in response to the query being a second query type, performing further actions, including:
visiting each field node in the hierarchy model that is an ancestor of the anchor field, wherein visiting an intervening calculation node or an intervening multi-input flow node terminates the traversal of the hierarchy model; and
collecting one or more values of the metadata for each visited field node that is an ancestor of the anchor field, wherein the one or more values of the metadata is sorted based on the one or more dependency relationships in the hierarchy model that correspond to the anchor field and the one or more visited ancestor field nodes.

11. The computer system of claim 8, wherein traversing the hierarchy model further comprises:
determining one or more security policies associated with the hierarchy model based on the query and a client that provided the query;
comparing the one or more visited field nodes and the client to the one or more security policies;
determining one or more restricted field nodes in the hierarchy model based on the comparison, wherein the one or more security policies exclude the client from accessing information associated with the one or more restrict field nodes; and
excluding one or more values of the metadata that are associated with the one or more restricted field nodes from the response to the query, wherein one or more of an identifier or data type associated with the one or more restricted field nodes, is included in the response to the query.

12. The computer system of claim 8, wherein the one or more processors execute instructions that perform actions, further comprising:
determining one or more of a timeout value or a node visitation limit value based on one or more of a query type, or the query;
in response to a time to provide the response to the query exceeding the timeout value, terminating the traversal of the hierarchy model and providing a partial response to the query that includes the one or more collected values of the metadata; and in response to a number of nodes visited in the hierarchy model exceeding the node visitation limit value, terminating the traversal of the hierarchy model and providing a partial response that includes the one or more collected values of the metadata.

13. The computer system of claim 8, wherein the one or more processors execute instructions that perform actions, further comprising:
   determining the type of query based on information provided with the query;
   determining one or more conditions for terminating the traversal based on the type of query; and
   determining response information to include in the response to the query based on the type of query, wherein the response information may include one or more of one or more values of the metadata, one or more aggregated values based on the one or more values of the metadata, or an execution of one or more other actions defined by the type of query.

14. The computer system of claim 8, wherein the one or processors execute instructions that perform actions, further comprising:
   in response to the anchor field being associated with a value of the metadata, including the value of the metadata associated with the anchor field in the response to the query; and
   in response to the value of the metadata being absent from the anchor field, providing the value of the metadata associated with an ancestor field node in the hierarchy model that is nearest the anchor field in the response to the query.

15. A non-transitory computer readable storage medium storing one or more programs, the one or more programs comprising instructions that, when executed by a computer system in communication with a display, cause the computer system to:
   for selected stored content including a first plurality of data assets, obtain a hierarchy model that includes one or more edges that represent dependency relationships between data assets in the first plurality of data assets and between data assets in the first plurality of data assets and one or more data assets in a second plurality of external data assets, wherein data assets in the first plurality of data assets and the second plurality of external data assets include one or more of workbooks, data sources, and flows that are represented as one or more field nodes, one or more calculation nodes, or one or more flow nodes in the hierarchy model;
   receive a query for obtaining lineage metadata for a selected anchor data asset in the first plurality of data assets, wherein the selected anchor data asset is represented as an anchor field in the hierarchy model;
   in response to the query for obtaining lineage data for the selected anchor data asset, traverse the hierarchy model upwards from the anchor field based on the query, wherein the traversing is performed by a lineage engine corresponding to a stored computer program and the traversing includes:
      in response to visiting one or more field nodes in the hierarchy model, collect one or more values of the metadata that correspond to the visited field node, wherein the traversal is terminated based on a type of the query;
      in response to visiting a calculation node, terminate the traversal of the hierarchy model associated with the visited calculation node; and
      in response to visiting a flow node that is dependent on two or more other nodes in the hierarchy model, terminate the traversal of the hierarchy model associated with the visited flow node; and
   display on the display, in a graphical user interface, the one or more collected values of the metadata that are inheritable to the anchor field.

16. The non-transitory computer readable storage medium of claim 15, wherein terminating the traversal based on the type of the query further comprises:
   in response to the query being a first query type, terminating the traversal of the hierarchy model in response to visiting a first ancestor field node of the anchor field that is associated with a value of the metadata, wherein the value of the metadata collected from the first ancestor field node is provided as the metadata for the anchor field.

17. The non-transitory computer readable storage medium of claim 15, wherein terminating the traversal based on the type of the query further comprises:
   in response to the query being a second query type, performing further actions, including:
   visiting each field node in the hierarchy model that is an ancestor of the anchor field, wherein visiting an intervening calculation node or an intervening multi-input flow node terminates the traversal of the hierarchy model; and
   collecting one or more values of the metadata for each visited field node that is an ancestor of the anchor field, wherein the one or more values of the metadata is sorted based on the one or more dependency relationships in the hierarchy model that correspond to the anchor field and the one or more visited ancestor field nodes.

18. The non-transitory computer readable storage medium of claim 15, wherein traversing the hierarchy model further comprises:
   determining one or more security policies associated with the hierarchy model based on the query and a client that provided the query;
   comparing the one or more visited field nodes and the client to the one or more security policies;
   determining one or more restricted field nodes in the hierarchy model based on the comparison, wherein the one or more security policies exclude the client from accessing information associated with the one or more restrict field nodes; and
   excluding one or more values of the metadata that are associated with the one or more restricted field nodes from the response to the query, wherein one or more of an identifier or data type associated with the one or more restricted field nodes, is included in the response to the query.

19. The non-transitory computer readable storage medium of claim 15, further comprising:
   determining one or more of a timeout value or a node visitation limit value based on one or more of a query type, or the query;
   in response to a time to provide the response to the query exceeding the timeout value, terminating the traversal of the hierarchy model and providing a partial response to the query that includes the one or more collected values of the metadata; and
   in response to a number of nodes visited in the hierarchy model exceeding the node visitation limit value, terminating the traversal of the hierarchy model and providing a partial response that includes the one or more collected values of the metadata.

20. The non-transitory computer readable storage medium of claim 15, further comprising:
    determining the type of query based on information provided with the query;
    determining one or more conditions for terminating the traversal based on the type of query; and
    determining response information to include in the response to the query based on the type of query, wherein the response information may include one or more of one or more values of the metadata, one or more aggregated values based on the one or more values of the metadata, or an execution of one or more other actions defined by the type of query.

* * * * *